(12) United States Patent
Yasumoto et al.

(10) Patent No.: US 11,218,107 B2
(45) Date of Patent: Jan. 4, 2022

(54) CONTROL DEVICE FOR POWER CONVERTER

(71) Applicant: DAIKIN INDUSTRIES, LTD., Osaka (JP)

(72) Inventors: Ryuuji Yasumoto, Osaka (JP); Nobuki Kitano, Osaka (JP); Naoto Kobayashi, Osaka (JP); Minoru Kitou, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 52 days.

(21) Appl. No.: 16/337,141

(22) PCT Filed: Aug. 24, 2017

(86) PCT No.: PCT/JP2017/030326
§ 371 (c)(1),
(2) Date: Mar. 27, 2019

(87) PCT Pub. No.: WO2018/061546
PCT Pub. Date: Apr. 5, 2018

(65) Prior Publication Data
US 2020/0036316 A1  Jan. 30, 2020

(30) Foreign Application Priority Data

Sep. 30, 2016 (JP) .............................. JP2016-192899

(51) Int. Cl.
*H02P 27/08* (2006.01)
*H02P 25/024* (2016.01)
(Continued)

(52) U.S. Cl.
CPC ........ *H02P 27/08* (2013.01); *H02M 7/53871* (2013.01); *H02P 21/22* (2016.02); *H02P 25/024* (2016.02)

(58) Field of Classification Search
CPC ........ H02P 27/08; H02P 21/22; H02P 25/024; H02M 7/53871
See application file for complete search history.

(56) References Cited

U.S. PATENT DOCUMENTS

2004/0201358 A1\* 10/2004 Kawaji ................. H02P 25/092
318/701
2011/0273125 A1   11/2011 Yamada et al.
(Continued)

FOREIGN PATENT DOCUMENTS

JP    2010-166677 A    7/2010
JP       4750553 B2    8/2011
(Continued)

OTHER PUBLICATIONS

International Search Report (PCT/ISA/210) issued in PCT/JP2017/030326, dated Nov. 7, 2017.

*Primary Examiner* — Kawing Chan
*Assistant Examiner* — Bradley R Brown
(74) *Attorney, Agent, or Firm* — Birch, Stewart, Kolasch & Birch, LLP

(57) ABSTRACT

A power converter converts a DC voltage including a pulsation component into an AC voltage and outputs the AC voltage to a synchronous electrical motor. A control device for controlling the power converter includes a pulsation component detection unit and a control circuit. The pulsation component detection unit detects a pulsation component. The control circuit controls the power converter so that a load angle of the synchronous electrical motor is increased in accordance with increase in an instantaneous value of the pulsation component.

16 Claims, 11 Drawing Sheets

(51) Int. Cl.
*H02M 7/5387* (2007.01)
*H02P 21/22* (2016.01)

(56) References Cited

U.S. PATENT DOCUMENTS

| | | | |
|---|---|---|---|
| 2014/0232309 A1* | 8/2014 | Zhou | H02P 21/05 |
| | | | 318/400.02 |
| 2014/0247003 A1* | 9/2014 | Yamasaki | B60L 15/025 |
| | | | 318/802 |
| 2015/0256095 A1* | 9/2015 | Ohta | H02P 21/05 |
| | | | 363/37 |
| 2017/0294864 A1* | 10/2017 | Tada | H02P 29/50 |
| 2018/0079611 A1* | 3/2018 | Kitamura | H02P 21/22 |

FOREIGN PATENT DOCUMENTS

| | | |
|---|---|---|
| JP | 2013-085455 A | 5/2013 |
| JP | 2014-036479 A | 2/2014 |
| JP | 5853360 B2 | 2/2016 |
| JP | 2016-082790 A | 5/2016 |

* cited by examiner

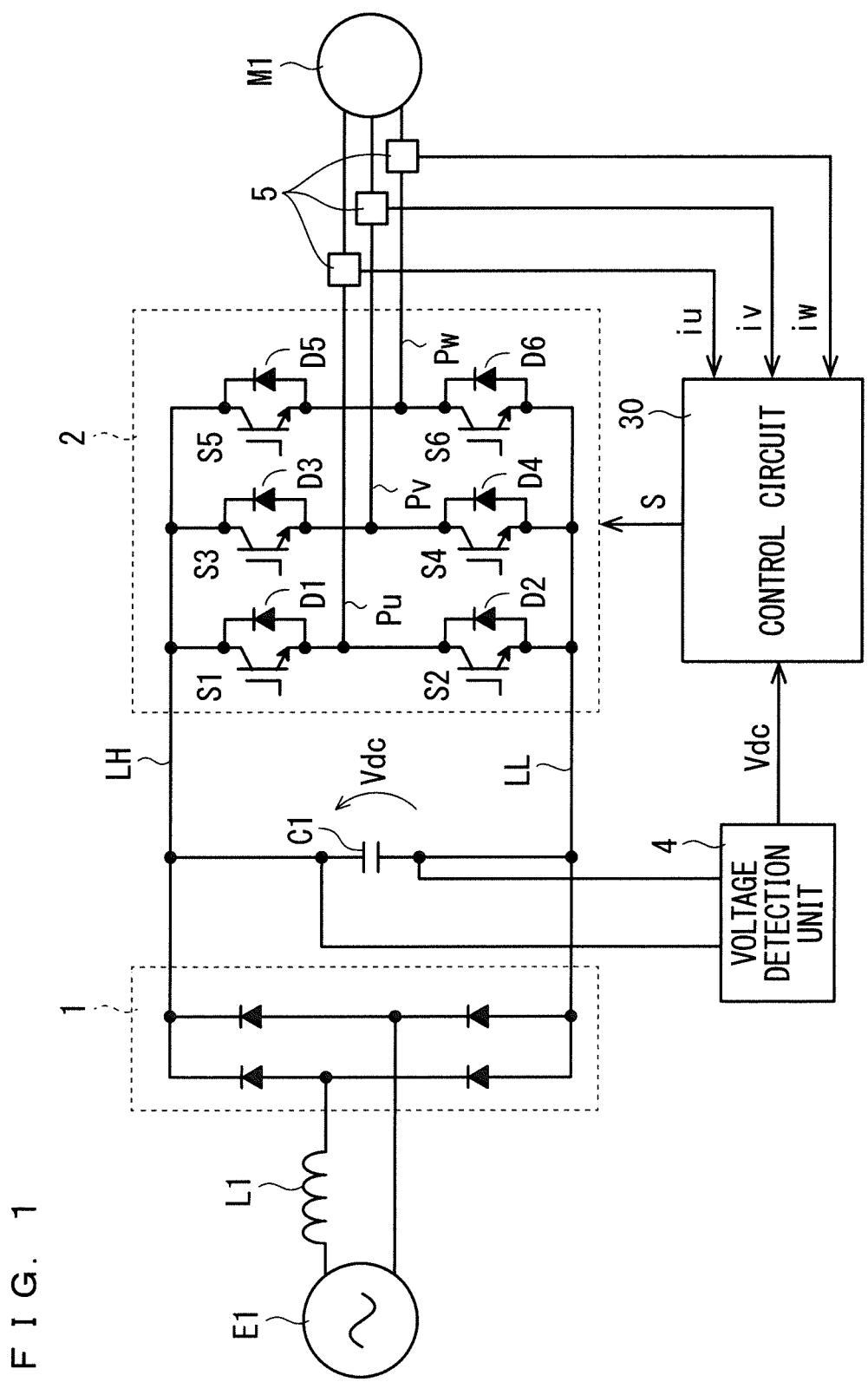
F I G . 1

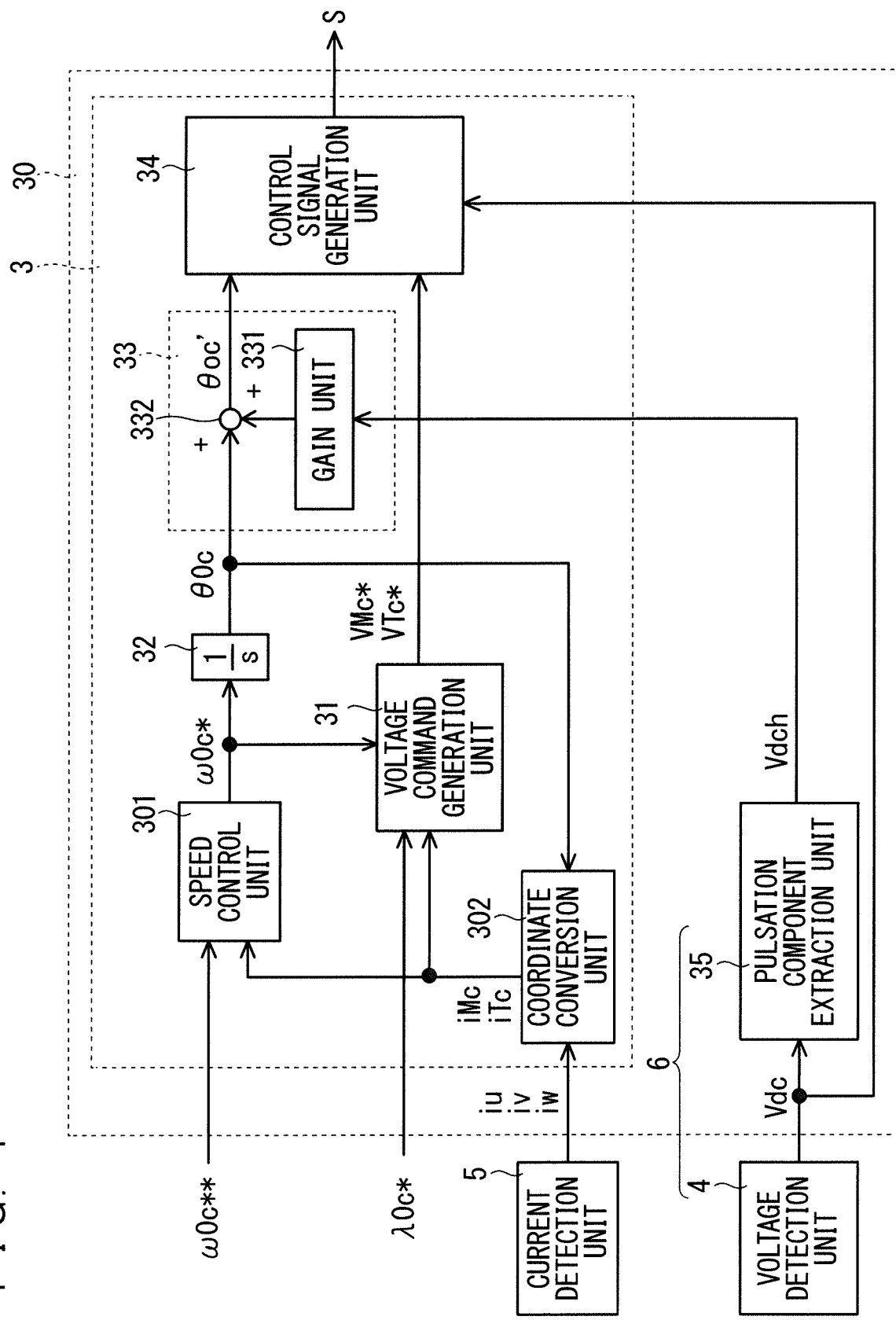
F I G. 4

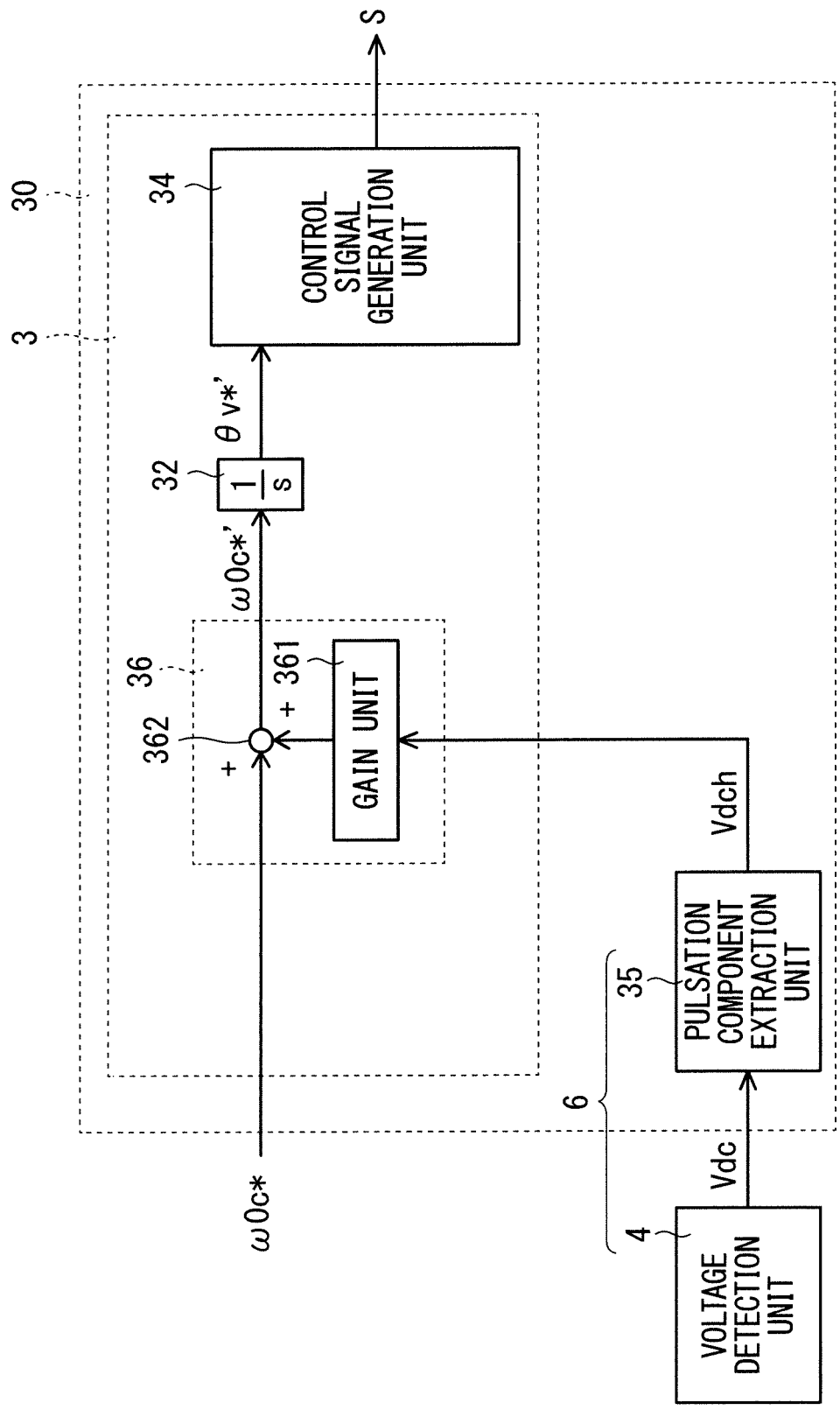
F I G. 12

CONTROL DEVICE FOR POWER CONVERTER

TECHNICAL FIELD

The present invention relates to a control device for a power converter.

BACKGROUND ART

An electrical motor driving device for driving an electrical motor is conventionally proposed. For example, the electrical motor driving device includes a converter, an inverter, and a capacitor. The converter converts an AC voltage into a DC voltage, and outputs the DC voltage between a pair of DC buses. The capacitor is connected between the pair of DC buses. The inverter converts the DC voltage between the pair of DC buses into the AC voltage, and outputs the AC voltage to the electrical motor.

The DC voltage between the pair of DC buses pulsates due to switching of the inverter, for example. That is to say, the DC voltage includes a pulsation component.

Japanese Patent No. 4750553 and Japanese Patent No. 5853360 are cited as techniques associated with the present application.

SUMMARY

Problem to be Solved by the Invention

Suppression in the pulsation component included in the DC voltage is anticipated.

It is an object of the present invention to provide a control device for a power converter capable of suppressing the pulsation component of the DC voltage.

Means to Solve the Problem

A first aspect of a control device for a power converter according to the present invention is a device for controlling a power converter (2) that converts a DC voltage (Vdc) including a pulsation component (Vdch) into an AC voltage and outputs the AC voltage to a synchronous electrical motor (M1), including: a pulsation component detection unit (6) that detects the pulsation component; and a control circuit (3) that controls the power converter so that a load angle of the synchronous electrical motor is increased in accordance with increase in an instantaneous value of the pulsation component.

A second aspect of the control device for the power converter according to the present invention is the control device for the power converter according to the first aspect, wherein the control circuit (3) controls the power converter (2) so that a voltage phase which is a phase of the AC voltage is increased in accordance with increase in an instantaneous value of the pulsation component to increase the load angle.

A third aspect of the control device for the power converter according to the present invention is the control device for the power converter according to the second aspect, wherein the control circuit (3) performs a correction of increasing a first voltage phase command ($\theta v^*$) for the voltage phase in accordance with increase in an instantaneous value of the pulsation component (Vdch) to generate a second voltage phase command ($\theta v^{*\prime}$), and generates a control signal (S) for controlling the power converter (2) on a basis of the second voltage phase command ($\theta v^{*\prime}$).

A fourth aspect of the control device for the power converter according to the present invention is the control device for the power converter according to the second aspect, wherein the control circuit (3) corrects a first rotation speed command ($\omega 0c^*$) for a rotation speed of the synchronous electrical motor in accordance with increase in an instantaneous value of the pulsation component (Vdch) to generate a second rotation speed command ($\omega 0c^{*\prime}$), integrates the second rotation speed command to generate a voltage phase command ($\theta v^{*\prime}$) for the voltage phase, and generates a control signal (S) for controlling the power converter (2) on a basis of the voltage phase command ($\theta v^{*\prime}$).

A fifth aspect of the control device for the power converter according to the present invention is the control device for the power converter according to the second aspect, wherein the control circuit (3) generates a first voltage command ($V^*$) for the AC voltage in a control coordinate system rotating in accordance with a rotation of the synchronous electrical motor (M1), calculates a phase difference ($\theta 0c'$) of the control coordinate system with respect to a fixed coordinate system, corrects the phase difference to increase in accordance with increase in the instantaneous value of the pulsation component (Vdch) to calculate a corrected phase difference ($\theta 0c$), performs a coordinate conversion on the first voltage command using the corrected phase difference to generate a second voltage command ($Vu^*, Vv^*, Vw^*$) for the AC voltage in the fixed coordinate system, and generates a control signal (S) for controlling the power converter (2) on a basis of the second voltage command.

A sixth aspect of the control device for the power converter according to the present invention is the control device for the power converter according to the second aspect, wherein the control circuit (3) generates a first voltage command ($V^*$) for the AC voltage in a control coordinate system rotating in accordance with a rotation of the synchronous electrical motor (M1), corrects a first rotation speed command ($\omega 0c^{**}$) for a rotation speed of the synchronous electrical motor in accordance with increase in the instantaneous value of the pulsation component (Vdch) to generate a second rotation speed command ($\omega 0c^*$), generates a phase difference ($\theta 0c$) of the control coordinate system with respect to a fixed coordinate system by integrating the second rotation speed command, performs a coordinate conversion on the first voltage command using the phase difference to generate a second voltage command ($Vu^*, Vv^*, Vw^*$) for the AC voltage in the fixed coordinate system, and generates a control signal (S) for controlling the power converter (2) on a basis of the second voltage command.

A seventh aspect of the control device for the power converter according to the present invention is the control device for the power converter according to the sixth aspect, wherein the control circuit (3) generates the first voltage command ($V^*$) on a basis of the first rotation speed command ($\omega 0c^{**}$).

An eighth aspect of the control device for the power converter according to the present invention is the control device for the power converter according to any one of the first to fourth aspects, wherein the control circuit (3) makes the power converter (2) output one pulse as the AC voltage.

A ninth aspect of the control device for the power converter according to the present invention is the control device for the power converter according to any one of the first to fourth aspects, wherein the power converter (2) operates in a pulse width modulation based on a carrier (C), and the control circuit (3) makes the power converter (2)

output the AC voltage including pulses smaller in number than a value obtained by dividing a frequency (Fv) of the AC voltage by a frequency (Fc) of the carrier, and at least one of the pulses has a pulse width larger than a cycle of the carrier.

A tenth aspect of the control device for the power converter according to the present invention is the control device for the power converter according to any one of the first to ninth aspects, wherein the synchronous electrical motor (M1) includes an armature having an armature winding and a field, and the control circuit (3) executes a primary magnetic flux control for controlling a magnitude of a primary magnetic flux which is a synthesis of an interlinkage magnetic flux to the armature winding by the field and a magnetic flux by an armature reaction generated by an alternating current flowing in the armature winding.

An eleventh aspect of the control device for the power converter according to the present invention is the control device for the power converter according to any one of the first to tenth aspects, wherein a first DC bus (LH) and a second DC bus (LL) between which the DC voltage (Vdc) is applied is connected to the power converter (2), a capacitor (C1) is connected between the first DC bus and the second DC bus, a reactor (L1) is provided on the first DC bus or the second DC bus on an opposite side of the power converter (2) relative to the capacitor, the pulsation component detection unit (6) detects, as a reverse phase of the pulsation component (Vdch), a voltage (VL) of the reactor when potential at one end of the reactor on a side of the capacitor is reference potential, or detects, as the pulsation component, a voltage of the reactor when potential at another end of the reactor is reference potential.

Effects of the Invention

According to the first and tenth aspects of the control device for the power converter according to the present invention, increase in the load angle in accordance with the increase in the instantaneous value of the pulsation component enables increase in the output power of the power converter. The increase in the output power enables increase in the input current being input to the power converter. The increase in the input current enables the suppression of further increase in the DC voltage, that is to say, the further increase in the instantaneous value of the pulsation component. Accordingly, reduced amplitude of the pulsation component is enabled.

According to the second aspect of the control device for the power converter according to the present invention, simple control of the load angle is enabled. Furthermore, changing amplitude of the AC voltage is not needed, thus decrease in an upper limit value of a voltage utilization ratio can also be suppressed.

According to the third aspect of the control device for the power converter according to the present invention, direct control of the voltage phase is enabled.

According to the fourth aspect of the control device for the power converter according to the present invention, correcting the rotation speed command enables correcting the voltage phase command.

According to the fifth aspect of the control device for the power converter according to the present invention, the voltage phase is corrected by correcting the phase difference used for the coordinate conversion, thus use of the conventional processing is enabled. In other words, calculation of the voltage phase in the control coordinate system is not needed, and the processing is simply performed.

According to the sixth aspect of the control device for the power converter according to the present invention, correction of the phase difference and furthermore correction of the voltage phase is enabled by correcting the rotation speed command.

According to the seventh aspect of the control device for the power converter according to the present invention, enabled is avoiding the fluctuation of the amplitude of the first voltage command caused by using the second rotation speed command.

According to the eighth aspect of the control device for the power converter according to the present invention, outputting the AC voltage is enabled while reducing the pulsation component. In other words, increasing the output voltage is enabled while reducing the pulsation component.

According to the ninth aspect of the control device for the power converter according to the present invention, outputting the AC voltage having the higher amplitude is enabled while reducing the pulsation component. In other words, the increased output voltage is obtained while reducing the pulsation component.

According to the eleventh aspect of the control device for the power converter according to the present invention, easy detection of the pulsation component is enabled.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a drawing schematically showing an example of a configuration of an electrical motor driving device;

FIG. 4 is a block diagram schematically showing an example of an inner configuration of a control circuit;

FIG. 12 is a block drawing schematically showing an example of an inner configuration of a control circuit;

DESCRIPTION OF EMBODIMENT(S)

Figure 2:
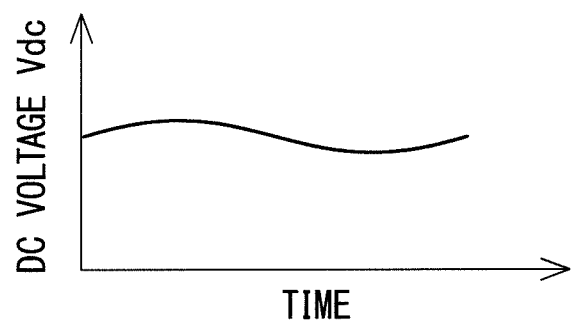
FIG. 2 is a diagram schematically showing an example of a DC voltage.

<Configuration of Electrical Motor Driving Device>
FIG. 1 schematically shows an example of a configuration of an electrical motor driving device. The electrical motor driving device includes a power converter 2, a control circuit 30, and a voltage detection unit 4, for example.

The power converter 2 is connected to DC buses LH and LL in an input side thereof. A DC voltage Vdc is applied between the DC buses LH and LL, and the DC voltage Vdc is input to the power converter 2. Potential applied to the DC bus LH is higher than potential applied to the DC bus LL.

A capacitor C1 may be connected between the DC buses LH and LL as shown in FIG. 1. The capacitor C1 may be a smoothing capacitor having a large capacitance, or may be a capacitor having a small capacitance (for example, a filter capacitor), for example. The DC voltage Vdc is applied to the capacitor C1.

As shown in FIG. 1, the electrical motor driving device may be provided with a rectifier 1. An input side of the rectifier 1 is connected to an AC source E1, and an output side of the rectifier 1 is connected to the DC buses LH and LL. The rectifier 1 rectifies the AC voltage being input from the AC source E1, and outputs the rectified DC voltage between the DC buses LH and LL. The rectifier 1 is a diode rectifier circuit, for example. The rectifier 1 is not limited to the diode rectifier circuit, but may be the other rectifier circuit (for example, a self-excited rectifier circuit or a separately excited rectifier circuit).

In the example in FIG. 1, the AC source E1 is a single-phase AC source, and is connected to the rectifier 1 via two input wirings. As shown in FIG. 1, a reactor L1 may be provided on one of the input wirings on an opposite side of the power converter 2 relative to the capacitor C1. The reactor L1 can suppress a high-frequency wave of an input current flowing in the input wiring. The AC source E1 is not limited to the single-phase AC source, but may be an N-phase AC source (N indicates an integral number equal to or larger than three). In other words, the rectifier 1 may be an N-phase rectifier.

The power converter 2 converts the DC voltage Vdc into an AC voltage based on a control signal S from the control circuit 30. Then, the power converter 2 outputs this AC voltage to an electrical motor M1. The power converter 2 is an inverter circuit, for example. In the example in FIG. 1, a three-phase inverter circuit is illustrated as the power converter 2. The power converter 2 includes switching elements S1 to S6 and diodes D1 to D6, for example.

The switching elements S1 to S6 are an insulating gate bipolar transistor, for example. The switching elements S1 and S2 are mutually connected in series between the DC buses LH and LL, the switching elements S3 and S4 are mutually connected in series between the DC buses LH and LL, and the switching elements S5 and S6 are mutually connected in series between the DC buses LH and LL. The switching elements S1 to S6 are electrically conducted/non-conducted on the basis of the control signal S from the control circuit 30.

The diodes D1 to D6 are connected to the switching elements S1 to S6 in parallel, respectively. Each forward direction of the diodes D1 to D6 is a direction from the DC bus LL toward the DC bus LH.

Each switching elements S1 to S6 may have a parasitic diode with a forward direction from the DC bus LL toward the DC bus LH. A MOS (metal-oxide-semiconductor) field-effect transistor can be exemplified as such switching elements S1 to S6. In this case, the diodes D1 to D6 need not be provided.

A connection point of connecting the switching elements S1 and S2 are connected to one end of an output wiring Pu, a connection point of connecting the switching elements S3 and S4 are connected to one end of an output wiring Pv, and a connection point of connecting the switching elements S5 and S6 are connected to one end of an output wiring Pw. The other ends of the output wirings Pu, Pv, and Pw are connected to the electrical motor M1.

The switching elements S1 to S6 are appropriately controlled, thus the power converter 2 converts the DC voltage Vdc into the AC voltage (the three-phase the AC voltage in the example in FIG. 1), and can output the converted AC voltage to the electrical motor M1 via the output wirings Pu, Pv, and Pw. The three-phase electrical motor M1 is exemplified in FIG. 1, however, a total number of phases is not limited thereto. In other words, the power converter 2 is not limited to the three-phase power converter.

The electrical motor M1 is a synchronous electrical motor, and includes a field (not shown) and an armature (not shown). The field has a permanent magnet, for example, and supplies an interlinkage magnetic flux to the armature. The armature has an armature winding. When the AC voltage from the power converter 2 is applied to the armature winding, an alternating current flows in the armature winding. The armature can apply a rotating field to the field, using the alternating current. The field relatively rotates with respect to the armature in accordance with the rotating field.

The control circuit 30 outputs the control signal S to the power converter 2 (specifically, the switching elements S1 to S6) to control the output of the power converter 2, thereby controlling the electrical motor M1.

Herein, the control circuit 30 includes a microcomputer and a storage device. The microcomputer executes each processing step (in other words, a procedure) described in a program. The storage device described above can be composed of one of a ROM (read only memory), a RAM (random access memory), a rewritable non-volatile memory (EPROM (erasable programmable ROM) or the like), and a hard disk device, or some of them, for example. The storage device stores various types of information or data, stores a program executed by the microcomputer, and provides a workspace for executing the program. The microcomputer can also be considered to function as various means corresponding to each processing step described in the program, or can also be considered to achieve various functions corresponding to each processing step. The configuration of the control circuit 30 is not limited thereto, but the various procedures executed by the control circuit 30 or part or all of the various means or various functions achieved by the control circuit 30 may be achieved by hardware.

<Pulsation Component of DC Voltage Vdc>

The DC voltage Vdc pulsates due to switching of the switching elements S1 to S6, for example. That is to say, the DC voltage Vdc includes the pulsation component having high frequency. FIG. 2 is a diagram schematically showing an example of the DC voltage Vdc. The example in FIG. 2 shows the DC voltage Vdc corresponding to one cycle of the pulsation component. The present embodiment aims to suppress increase in amplitude of such a pulsation component (that is to say, a fluctuation range of the DC voltage Vdc) by control.

In the example in FIG. 1, the reactor L1 on the input side of the rectifier 1 and the capacitor C1 on the output side of the rectifier 1 are connected in series between the output ends of the AC source E1, thus the reactor L1 and the capacitor C1 can form a resonance circuit. Accordingly, the amplitude of the pulsation component of the DC voltage Vdc drastically increases due to a resonance caused by the resonance circuit in some cases. The present control also aims to suppress increase in the amplitude of such a pulsation component caused by the resonance. Thus, the control in the present embodiment for suppressing the amplitude of the pulsation component is referred to as the resonance suppression control in some cases hereinafter. However, the present control is not necessarily based on a premise of the occurrence of the resonance. The reason is that a pulsation component having large amplitude may occur in some cases even when the resonance does not occur.

<Basic Concept of Resonance Suppression Control>

Next, a basic concept of the resonance suppression control is described. In the resonance suppression control, an output power of the power converter 2 is controlled, thus the DC voltage Vdc which is an input voltage of the power converter 2 is controlled. Specifically, the output power of the power converter 2 is increased in accordance with increase in an instantaneous value of the pulsation component of the DC voltage Vdc. Accordingly, the output current from the power converter 2 and therefore the direct current being input to the power converter 2 increase during a period of time when the instantaneous value of the pulsation component increases. The increase in the direct current enables the suppression of the further increase in the pulsation component of the DC voltage Vdc. Accordingly, the amplitude of the pulsation component can be reduced.

Conversely, the output power of the power converter 2 is reduced in accordance with the decrease in the instantaneous value of the pulsation component. Accordingly, the direct current being input to the power converter 2 decreases during a period of time when the instantaneous value of the pulsation component decreases. The decrease in the direct current enables the suppression of the further decrease in the pulsation component of the DC voltage Vdc. Accordingly, the amplitude of the pulsation component can be reduced.

<Summary of Resonance Suppression Control>

In the present embodiment, a load angle (described hereinafter) of the electrical motor M1 is controlled to control the output power. A relationship between the load angle and the output power is firstly described hereinafter. Ideally speaking, the output power of the power converter 2 is equal to the output of the electrical motor M1. The output of the electrical motor M1 is expressed by a product of an output torque and a rotation speed. The output torque is determined by a magnitude of a primary magnetic flux (described hereinafter) and the load angle.

Figure 3:
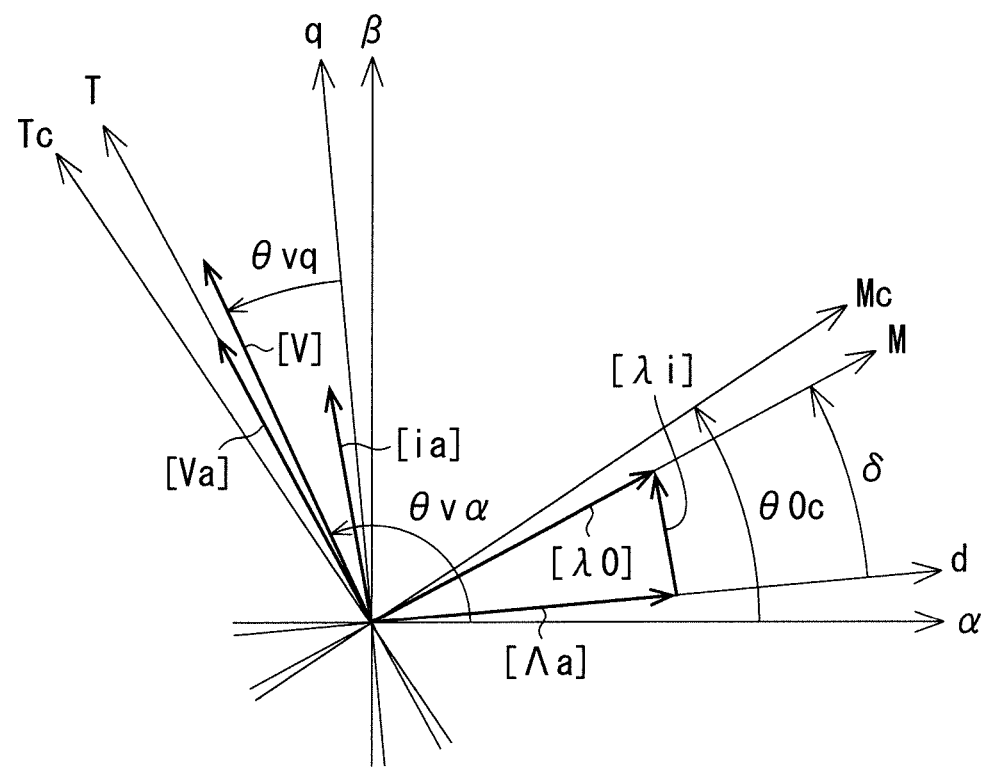
FIG. 3 is a drawing showing an example of a vector diagram.

Next, the primary magnetic flux and the load angle are described. FIG. 3 is a vector diagram illustrating a relationship between a primary magnetic flux [λ0] (a symbol [ ] indicates a vector quantity: the same applies to the description hereinafter) in the electrical motor M1 and an interlinkage magnetic flux [Λa] to the armature due to a field. If the electrical motor M1 has a permanent magnet, the interlinkage magnetic flux [Λa] is generated by the permanent magnet, and if the electrical motor M1 has a field winding, the interlinkage magnetic flux [Λa] is generated by a current flowing in the field winding.

In FIG. 3, an α-β axis fixed coordinate system, a d-q axis rotational coordinate system, an M-T axis rotational coordinate system, and an Mc-Tc axis rotational coordinate system are illustrated with an origin coinciding with one another. The a-β axis fixed coordinate system is a coordinate system fixed to a stator (an armature, for example) of the electrical motor M1, and is composed of an α axis and a β axis. The β axis leads in phase to the α axis by 90 degrees. The d-q axis rotational coordinate system is a coordinate system fixed to a rotator (a field, for example) of the electrical motor M1, and is composed of a d axis and a q axis. The d axis is set to have the same phase as the interlinkage magnetic flux [Λa], and the q axis leads in phase to the d axis by 90 degrees. Thus, the d-q axis rotational coordinate system rotates in synchronization with the rotation of the electrical motor M1. The M-T axis rotational coordinate system is a coordinate system rotating in accordance with the rotation of the electrical motor M1, and is made up of a M axis and a T axis. The M axis is set to have the same phase as the primary magnetic flux [λ0], and the T axis leads in phase to the M axis by 90 degrees. The Mc-Tc axis rotational coordinate system is a coordinate system used for control (also referred to as the control coordinate system hereinafter), and ideally speaking, it coincides with the M-T axis rotational coordinate system, for example.

The primary magnetic flux [λ0] is a synthesis of a field [λi] by an armature reaction generated by the alternating current flowing in the armature winding and the interlinkage magnetic flux [Λa]. The current flowing in the armature winding is indicated by a current [ia] in FIG. 3. The field [λi] by the armature reaction is determined by the current flowing in the armature winding and inductance of the armature winding as is commonly known. A load angle δ is an angle between the d axis and the M axis.

In FIG. 3, a voltage [V] and a voltage [Va] are also illustrated for reference. The voltage [V] is a voltage applied to the electrical motor M1, and the voltage [Va] is a voltage applied to an inductance component of the armature winding. Thus, the voltage [V] is a synthesis of a product of a resistance value R of a resistance component of the armature winding and a current [Ia.], and the voltage [Va].

When a magnitude of the primary magnetic flux [λ0] is constant, the output torque increases in accordance with increase in the load angle δ, takes a peak value, and then decreases in accordance with the increase in the load angle. The electrical motor M1 is normally controlled within a range where the output torque increases in accordance with the increase in the load angle δ. Accordingly, it can be considered that the output torque increases with the increase in the load angle δ.

Thus, in the present embodiment, the control circuit 30 controls the power converter 2 so that the load angle δ increases in accordance with the increase in the instantaneous value of the pulsation component of the DC voltage Vdc. Accordingly, the output power can be increased in accordance with the increase in the instantaneous value of the pulsation component, and the further increase in the instantaneous value of the pulsation component can be suppressed. Conversely, the control circuit 30 controls the power converter 2 so that the load angle δ decreases in accordance with the decrease in the instantaneous value of the pulsation component of the DC voltage Vdc. Accordingly, the output power can be reduced in accordance with the decrease in the instantaneous value of the pulsation component, and the further decrease in the instantaneous value of the pulsation component can be suppressed. Thus, the amplitude of the pulsation component can be reduced.

<Voltage Phase>

For example, the control circuit 30 may control the load angle δ by controlling a phase of the AC voltage being output from the power converter 2 (also referred to as the voltage phase hereinafter). A relationship between the voltage phase and the load angle δ is described hereinafter.

The example in FIG. 3 shows, as the voltage phase, a voltage phase θvq in the d-q axis rotational coordinate system and a voltage phase θvα in the α-β axis fixed coordinate system. For example, the voltage phase θvq is a phase of the voltage [V] with respect to the q axis, and the voltage phase θvα is a phase of the voltage [V] with respect to the α axis. Although the voltage phase can be described using any of the voltage phases θvq and θvα, the voltage phase is described herein using the voltage phase θvq.

For example, if the voltage phase θvq is increased, the voltage [V] rotates in an advancing direction (counterclockwise in FIG. 3, for example), and according to this, the voltage [Va] also rotates in the advancing direction. That is to say, the M-T axis rotational coordinate system rotates in the advancing direction relative to the d-q axis rotational coordinate system. Thus, the load angle δ increases. Accordingly, the output torque increases and the output power of the power converter 2 increases. In contrast, if the voltage phase is reduced, the load angle δ decreases in accordance with this. Accordingly, the output torque decreases and the output power of the power converter 2 decreases.

For example, the control circuit 30 controls the power converter 2 so that the voltage phase increases in accordance with the increase in the instantaneous value of the pulsation component of the DC voltage Vdc. Accordingly, the load angle δ can be increased in accordance with the increase in the instantaneous value of the pulsation component, and the output power can be increased. Thus, the further increase in the instantaneous value of the pulsation component can be suppressed. Conversely, the control circuit 30 controls the power converter 2 so that the voltage phase decreases in accordance with the decrease in the instantaneous value of the pulsation component of the DC voltage Vdc. Accordingly, the load angle δ can be reduced in accordance with the decrease in the instantaneous value of the pulsation component, and the output power can be reduced. Thus, the further decrease in the instantaneous value of the pulsation component can be suppressed. Thus, the amplitude of the pulsation component can be reduced.

The increase in the instantaneous value of the pulsation component is also referred to as simply the increase in the pulsation component, and the decrease in the instantaneous value of the pulsation component is also referred to as simply the decrease in the pulsation component hereinafter.

<Specific Example of Resonance Suppression Control>

FIG. 4 is a function block diagram schematically showing an example of an inner configuration of the control circuit 30. The control circuit 30 includes a voltage command generation unit 31, an integrator 32, a voltage phase correction unit 33, a coordinate conversion unit 302, and a control signal generation unit 34.

The voltage command generation unit 31 generates a voltage command for the AC voltage being output from the power converter 2. The voltage command is a voltage command in a predetermined control coordinate system. The control coordinate system is a rotational coordinate system and may be appropriately set. A method of generating the voltage command is not particularly limited, however, the voltage command generation unit 31 may execute a primary magnetic flux control to generate the voltage command, for example. In this case, the Mc-Tc axis rotational coordinate system shown in FIG. 3 can be applied as the control coordinate system. The voltage command includes a voltage command VMc* which is a Mc axis component and a voltage command VTc* which is a Tc axis component.

FIG. 4 exemplifies the control circuit 30 generating the voltage command using the primary magnetic flux control. In the example in FIG. 4, a primary magnetic flux command λ0c*, a rotation speed command ω0c*, and currents iMc and iTc are input to the voltage command generation unit 31. The primary magnetic flux command λ0c* is a command on a magnitude of the primary magnetic flux [λ0], and is input to the voltage command generation unit 31 from outside, for example.

The rotation speed command ω0c* is a command on the rotation speed of the control coordinate system. In the example in FIG. 4, the rotation speed command ω0c* is calculated by a speed control unit 301 belonging to the control circuit 30. A rotation speed command ω0c** and the currents iMc and iTc are input to the speed control unit 301. The currents iMc and iTc express an alternating current flowing in the electrical motor M1 by the Mc-Tc axis rotational coordinate system, and are a Mc axis component and a Tc axis component of the current [ia], respectively. The current flowing in the electrical motor M1 is detected by a current detection unit 5 (also refer to FIG. 1). The current detection unit 5 is a current detection circuit, for example, and detects currents iu, iv, and iw flowing in the output wirings Pu, Pv, and Pw, respectively, and outputs the currents iu, iv, and iw to a control circuit 3. The currents iu, iv, and iw are input to the coordinate conversion unit 302 belonging to the control circuit 30. A phase angle θ0c of the Mc-Tc axis rotational coordinate system is also input to the coordinate conversion unit 302. The phase angle θ0c indicates a phase difference between the a axis and the Mc axis. The phase angle θ0c is also referred to as the phase difference θ0c hereinafter. The coordinate conversion unit 302 performs a coordinate conversion on the currents iu, iv, and iw on the basis of the phase difference θ0c to calculate the currents iMc and iTc.

Although the current detection unit 5 detects all of the currents iu, iv, and iw in the example in FIG. 1, the current detection unit 5 may detect two of the currents iu, iv, and iw. Ideally speaking, a total sum of the currents iu, iv, and iw is zero, thus remaining one current can be calculated from the two currents. Although the current detection unit 5 directly detects the current iu, iv, and iw in the example in FIG. 1, the current detection unit 5 may detect the direct current flowing in the DC bus LH or the DC bus LL. Specifically, the current detection unit 5 may detect the direct current flowing in the DC bus LH or the DC bus LL between the capacitor C1 and the power converter 2. The direct current coincides with the current in accordance with a switching pattern of the switching elements S1 to S6 in the currents iu, iv, and iw. Thus, the currents iu, iv, and iw can be figured out on the basis of the switching pattern and the direct current. The current detection described above is referred to as so-called a one-shunt system.

The speed control unit 301 corrects the rotation speed command ω0c** on the basis of at least one of the currents iMc and iTc to calculate the rotation speed command ω0c*, and outputs the rotation speed command ω0c* to the integrator 32 and the voltage command generation unit 31. For example, the speed control unit 301 extracts harmonics of the current iTc, and subtracts a correction amount obtained by multiplying the harmonics by a predetermined positive gain from the rotation speed command ω0c** to calculate the rotation speed command ω0c*.

The correction of the rotation speed command contributes to a stable driving of the electrical motor M1, but is not needed necessarily. For example, the speed control unit 301 may output the rotation speed command ω0c** as the rotation speed command ω0c* without change.

The voltage command generation unit 31 generates the voltage commands VMc* and VTc* on the basis of the primary magnetic flux command λ0c*, the rotation speed command ω0c*, and the currents iMc and iTc, and outputs the voltage commands VMc* and VTc* to the control signal generation unit 34. For example, the voltage command generation unit 31 may perform a feedforward control on the primary magnetic flux command λ0c* to generate the voltage commands VMc* and VTc*. As a specific example, the voltage command generation unit 31 generates the voltage commands VMc* and VTc* on the basis of the following expressions.

$$VMc^* = R \cdot iMc + s \cdot \lambda Mc^* - \omega 0c^* \cdot \lambda Tc^* \quad (1)$$

$$VTc^* = R \cdot iTc + s \cdot \lambda Tc^* + \omega 0c^* \cdot \lambda Mc^* \quad (2)$$

Herein, λM* and λTc* are magnetic flux commands for the primary magnetic flux [λ0], and are the Mc axis component and the Tc axis component, respectively. For example, when the primary magnetic flux command λTc* is set to zero, the primary magnetic flux command λMc* is equal to the primary magnetic flux command λ0c*. Each of the expression (1) and the expression (2) corresponds to a voltage equation of the electrical motor M1. According to these expression (1) and the expression (2), it can be recognized that the voltage commands VMc* and VTc* are calculated by the feedforward control.

A first term of each of the expression (1) and the expression (2) is smaller than a second term and a third term thereof in some cases. For example, when the rotation speed command ω0c* is high, the first term is small. In such a case, the first term of each of the expression (1) and the expression (2) may be omitted.

It is not necessary to use the expression (1) and the expression (2) in the voltage command generation unit 31. The voltage command generation unit 31 may use a feedback control in place of the feedforward control or together with the feedforward control.

The integrator 32 integrates the rotation speed command ω0c* to calculate the phase difference θ0c of the Mc-Tc axis rotational coordinate system. The integrator 32 outputs the phase difference θ0c to the coordinate conversion unit 302 and the voltage phase correction unit 33.

A pulsation component Vdch of the DC voltage Vdc is also input to the voltage phase correction unit 33. The pulsation component Vdch is input from a pulsation component extraction unit 35 to the voltage phase correction unit 33, for example. The pulsation component extraction unit 35 may be provided in the control circuit 30, for example. The DC voltage Vdc is input to the pulsation component extraction unit 35. The DC voltage Vdc is detected by the voltage detection unit 4 (also refer to FIG. 1). The pulsation component extraction unit 35 extracts the pulsation component Vdch from the DC voltage Vdc, and outputs the pulsation component Vdch to the voltage phase correction unit 33.

Figure 5:
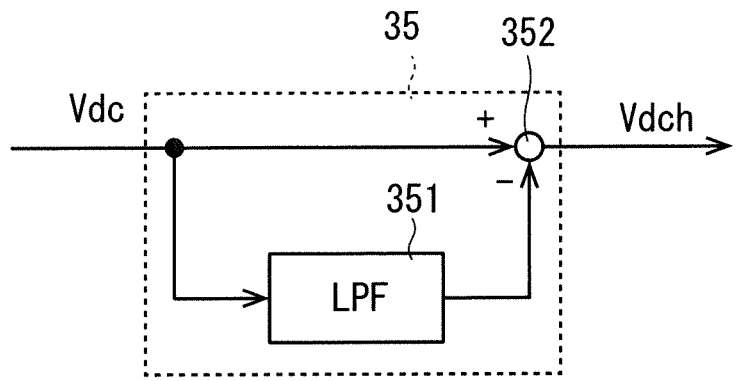
FIG. 5 is a block diagram schematically showing an example of an inner configuration of a pulsation component extraction part.

FIG. 5 is a function block diagram schematically showing an example of an inner configuration of the pulsation component extraction unit 35. For example, the pulsation component extraction unit 35 includes a low pass filter 351 and a subtractor 352. The DC voltage Vdc from the voltage detection unit 4 is input to the low pass filter 351. The low pass filter 351 removes the pulsation component Vdch from the DC voltage Vdc, and outputs the DC voltage Vdc on which the removing processing has performed (that is to say, a low-frequency wave of the DC voltage Vdc, for example, the direct current component) to the subtractor 352. The DC voltage Vdc from the voltage detection unit 4 is input to the subtractor 352. The subtractor 352 subtracts the output of the low pass filter 351 from the DC voltage Vdc being output by the voltage detection unit 4 to calculate the pulsation component Vdch of the DC voltage Vdc, and outputs the pulsation component Vdch to the voltage phase correction unit 33.

The pulsation component extraction unit 35 may have a high pass filter in place of the configuration in FIG. 5. The DC voltage Vdc is input from the voltage detection unit 4 to the high pass filter. The high pass filter removes the low-frequency wave from the DC voltage Vdc to extract the pulsation component Vdch, and outputs the pulsation component Vdch to the voltage phase correction unit 33.

The phase difference θ0c and the pulsation component Vdch of the DC voltage Vdc are input to the voltage phase correction unit 33. The voltage phase correction unit 33 corrects the phase difference θ0c on the basis of the pulsation component Vdch, thereby correcting the voltage phase. The reason why the voltage phase can be corrected by correcting the phase difference θ0c is described hereinafter.

The voltage phase correction unit 33 increases the phase difference θ0c in accordance with the increase in the pulsation component Vdch to calculate a corrected phase difference θ0c', and outputs the phase difference θ0c' to the control signal generation unit 34.

As shown in FIG. 4, the voltage phase correction unit 33 includes a gain unit 331 and an adder 332, for example. The pulsation component Vdch is input from the pulsation component extraction unit 35 to the gain unit 331. The gain unit 331 multiplies the pulsation component Vdch by a gain K, and output a result thereof (K·Vdch) to the adder 332. The gain K may be a positive value which is preset, for example, and is stored in a predetermined storage medium belonging to the control circuit 30. The phase difference θ0c is also input to the adder 332. The adder 332 adds the output from the gain unit 331 to the phase difference θ0c to calculate the phase difference θ0c'. The following expression indicates a calculation of the voltage phase correction unit 33 exemplified in FIG. 4.

$$\theta 0c' = \theta 0c + K \cdot Vdch \quad (3)$$

According to the expression (3), the phase difference θ0c' increases as the pulsation component Vdch increases, and decreases as the pulsation component Vdch decreases. More specifically, the phase difference θ0c' pulsates similarly to a waveform of the pulsation component Vdch. Thus, it can also be described that the voltage phase correction unit 33 in FIG. 4 superposes the pulsation component Vdch with the phase difference θ0c.

According to the expression (3), when the pulsation component Vdch is positive, the phase difference θ0c' is calculated to be larger than the phase difference θ0c, and when the pulsation component Vdch is negative, the phase difference θ0c' is calculated to be smaller than the phase difference θ0c. That is to say, the voltage phase correction unit 33 may calculate the corrected phase difference θ0c' to be larger than the phase difference θ0c which has not been corrected when the DC voltage Vdc is larger than an average value of the DC voltage Vdc, and calculate the corrected phase difference θ0c' to be smaller than the phase difference θ0c which has not been corrected when the DC voltage Vdc is smaller than the average value of the DC voltage Vdc.

The voltage commands VMc* and VTc* and the phase difference θ0c' are input to the control signal generation unit 34. The control signal generation unit 34 generates the control signal S on the basis of the voltage commands VMc* and VTc* and the phase difference θ0c', and outputs the control signal S to the power converter 2. A specific example is described. The control signal generation unit 34 performs a coordinate conversion on the voltage commands VMc* and VTc* using the phase difference θ0c', and generates three-phase voltage commands in a UVW fixed coordinate system not shown. Then, for example, the control signal generation unit 34 divides each of the three-phase voltage commands by the DC voltage Vdc to normalize the three-phase voltage commands. The control signal generation unit 34 generates the control signal S based on a comparison between the normalized voltage commands and a predetermined carrier. Such a method of generating the control signal S is a method used in a pulse width modulation. In this case, the power converter 2 operates in the pulse width modulation based on a carrier C.

Figure 6:
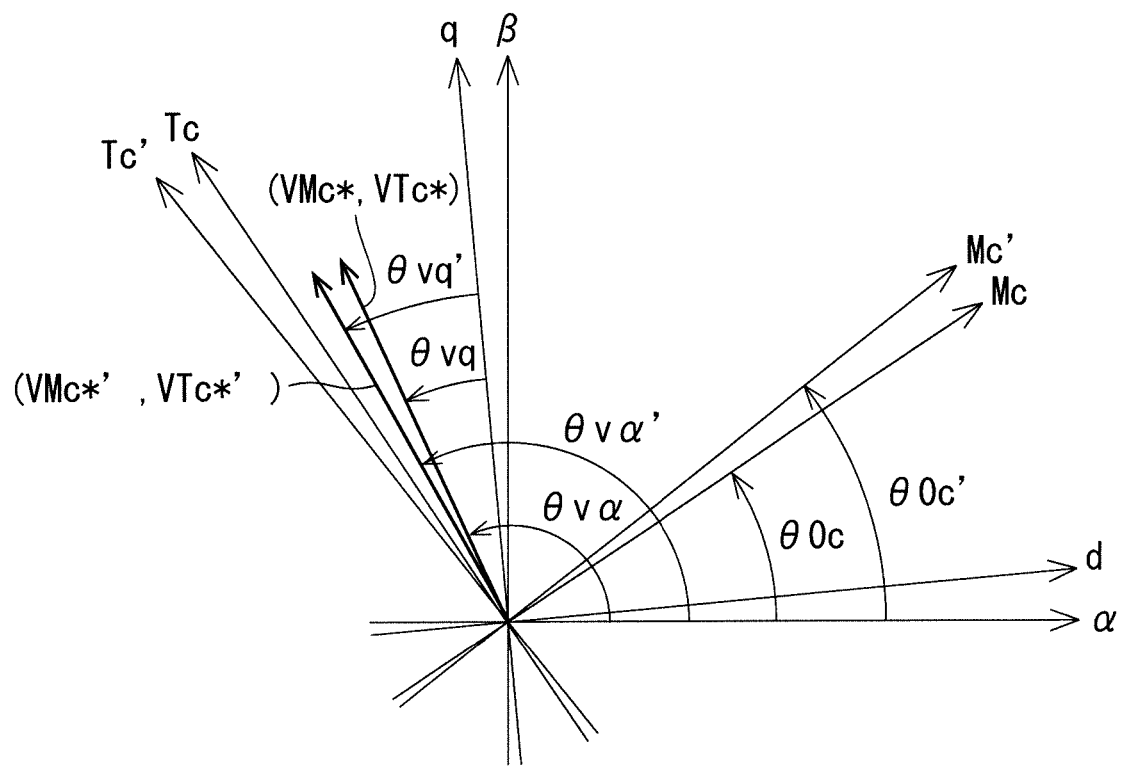
FIG. 6 is a drawing showing an example of a vector diagram.

As described above, the control signal generation unit 34 performs the coordinate conversion on the voltage commands VMc* and VTc* using the corrected phase difference θ0c', and generates the three-phase voltage commands. FIG. 6 is a drawing for describing the coordinate conversion. FIG. 6 illustrates the Mc-Tc axis rotational coordinate system as the control coordinate system. The phase angle of the Mc-Tc axis rotational coordinate system is the phase difference θ0c. FIG. 6 also shows a corrected control coordinate system indicated by the corrected phase difference θ0c', that is to say, a Mc'-Tc' axis rotational coordinate system.

As described above, the control signal generation unit 34 performs the coordinate conversion on the voltage commands VMc* and VTc* using not the phase difference θ0c but the corrected phase difference θ0c' That is to say, this coordinate system does not correspond to the coordinate conversion for the voltage commands VMc* and VTc* but corresponds to the coordinate conversion for voltage commands VMc*' and VTc*' (described hereinafter) in the Mc'-Tc' axis rotational coordinate system.

The values of the voltage commands VMc*' and VTc*' themselves are the same as the values of the voltage commands VMc* and VTc*, respectively. The voltage commands VMc* and VTc* indicate the values in the Mc-Tc axis rotational coordinate system, however, the voltage commands VMc*' and VTc*' indicate the values in the Mc'-Tc' axis rotational coordinate system. That is to say, the voltage commands VMc*' and VTc*' are the voltage commands obtained by rotating the voltage commands VMc* and VTc* with a phase difference between the Mc-Tc axis rotational coordinate system and the Mc'-Tc' axis rotational coordinate system (=θ0c'−θ0c). That is to say, a voltage phase θvq' (θvα') of the voltage commands VMc*' and VTc*' indicate the values obtained by correcting a voltage phase θvq (θvα) with a correction amount (K·Vdch).

In short, the control signal generation unit 34 performs the coordinate conversion on the voltage commands VMc*' and VTc*' using the phase difference θ0c'. This means that the voltage phase is corrected with the correction amount similar to the correction amount (K·Vdch) for the phase difference θ0c.

As described above, in the present embodiment, the voltage phase is increased in accordance with the increase in the pulsation component Vdch of the DC voltage Vdc by increasing the phase difference θ0c' in accordance with the increase in the pulsation component Vdch. Conversely, the voltage phase is reduced in accordance with the decrease in the pulsation component Vdch by reducing the phase difference θ0c' in accordance with the decrease in the pulsation component Vdch.

The voltage phase is increased in accordance with the increase in the pulsation component Vdch as described above, thus the load angle δ can be increased in accordance with the increase in the pulsation component Vdch, and the output torque can be increased. Thus, the output power of the power converter 2 can be increased in accordance with the increase in the pulsation component Vdch. In contrast, the output power can be reduced in accordance with the decrease in the pulsation component Vdch. Thus, the amplitude of the pulsation component Vdch can be reduced. That is to say, a fluctuation of the DC voltage Vdc (the amplitude of the pulsation component Vdch) can be reduced.

Moreover, if the load angle δ is controlled based on the voltage phase as described in the present embodiment, the load angle δ can be simply controlled.

According to the present embodiment, increase or decrease in the magnitude (the amplitude) of the voltage command is not needed on the basis of the pulsation component Vdch. That is to say, increase or decrease in the amplitude of the AC voltage being output by the power converter 2 is not needed. As a comparison example, in the technique in Japanese Patent No. 4750553, for example, the amplitude of the AC voltage may increase and decrease. In this case, the amplitude of the AC voltage cannot be kept to an upper limit value as a matter of course. That is to say, an average value of the amplitudes of the AC voltage is smaller than the upper limit value. Such a decrease in the average value of the amplitudes of the AC voltage is not preferable from a viewpoint of controlling a rotation speed in a higher range.

A voltage utilization ratio is introduced herein. A voltage utilization ratio is an index indicating a ratio of an average output of the AC voltage to the DC voltage Vdc. The voltage utilization ratio is expressed by a proportion of the average value of the amplitude of the AC voltage to the DC voltage Vdc, for example. Since the decrease in the average value of the amplitudes of the AC voltage is not preferable as described above, the decrease in the upper limit value of the voltage utilization ratio is not also preferable.

In the meanwhile, according to the present embodiment, increase or decrease in the magnitude (the amplitude) of the voltage command is not needed for reducing the pulsation component Vdch. Thus, the amplitude of the AC voltage can be kept to the upper limit value. According to the above configuration, the decrease in the upper limit value of the voltage utilization ratio can be avoided or suppressed.

In the example described above, the phase difference θ0c is corrected on the basis of the pulsation component Vdch. It is considered, as the other example, that the voltage phase in the control coordinate system is calculated on the basis of the voltage commands VMc* and VTc* and the voltage phase is corrected on the basis of the pulsation component Vdch. Specifically, the voltage commands VMc* and VTc* are the values in a rectangular coordinate system, thus the amplitude of the voltage command and the voltage phase in the control coordinate system can be calculated by coordinate converting the voltage commands VMc* and VTc* into values in a polar coordinate system. It is also applicable to correct the voltage phase and calculate the corrected voltage commands VMc* and VTc* in the rectangular coordinate system again on the basis of the corrected voltage phase and the amplitude. The action similar to that of the control described above can also be obtained by the above processing, and the amplitude of the pulsation component Vdch of the DC voltage Vdc can be reduced. However, processing of calculating the voltage phase in the control coordinate system, for example, is necessary.

In the meanwhile, if the phase difference θ0c is corrected, it is not necessary to calculate the voltage phase in the control coordinate system or calculate the corrected voltage command on the basis of the corrected voltage phase. That is to say, the processing can be simplified.

With reference to FIG. 4, a part composed of the voltage detection unit 4 and the pulsation component extraction unit 35 corresponds to the pulsation component detection unit 6 detecting the pulsation component Vdch of the DC voltage Vdc. In this case, a part of the control circuit 30 except for the pulsation component detection unit 6 corresponds to the control circuit 3 controlling the power converter 2 and increasing the load angle δ in accordance with the increase in the pulsation component Vdch.

<Overmodulation>

The switching elements S1, S3, and S5 are also referred to as the upper side switching elements, and the switching elements S2, S4, and S6 are also referred to as the lower side switching elements. Although the same applies to the example described above, the upper side switching elements and the lower side switching elements connected to the same output terminal are controlled so that they are mutually and exclusively turned on.

An upper limit of the amplitude of the AC voltage which can be output by the power converter 2 is limited by the DC voltage Vdc. Thus, also in a case where a substantial sinusoidal waveform is applied as the AC voltage, the upper limit of the amplitude thereof is limited by the DC voltage Vdc. Thus, in a case where the power converter 2 outputs the larger voltage, a substantial trapezoidal waveform or a rectangular waveform may be applied as the AC voltage instead of the sinusoidal waveform. That is to say, a period of time when the instantaneous value of the AC voltage takes a maximum value (a period of time when the upper side switching elements are in an on state) and a period of time when the instantaneous value of the AC voltage takes a minimum value (a period of time when the lower side switching element are in an on state) are lengthened, thus the AC voltage having substantially a larger amplitude is output. Such a control is also referred to as overmodulation control.

The amplitude of the AC voltage being output by the power converter 2 tends to be larger as the rotation speed of the electrical motor M1 increases. Thus, the control circuit 3 preferably performs the overmodulation control when the rotation speed (or the rotation speed command) is larger than a reference value.

<Rectangular Wave>

Figure 7:
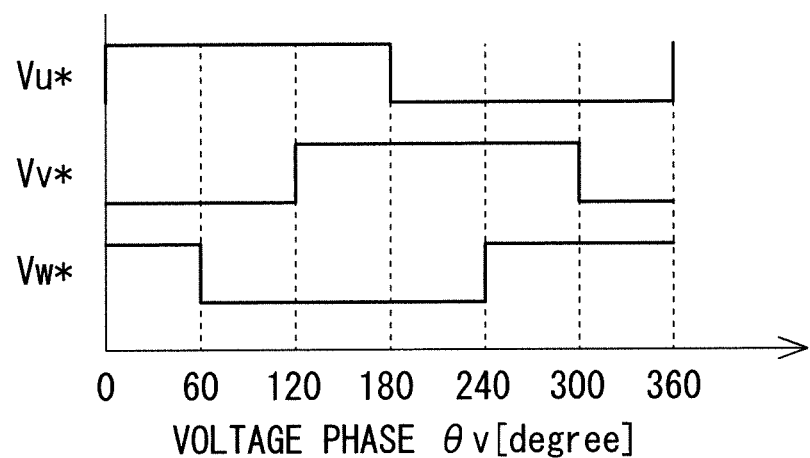
FIG. 7 is a drawing schematically showing an example of voltage commands.

FIG. 7 is a drawing schematically showing an example of the voltage commands Vu*, Vv*, and Vw* for the AC voltages Vu, Vv, and Vw applied to the output wirings Pu, Pv, and Pw. In the example in FIG. 7, each of the voltage commands Vu*, Vv*, and Vw* has a rectangular waveform (more specifically, one pulse waveform). The phase difference between the voltage commands Vu*, Vv*, and Vw* is substantially 120 degrees. Such voltage commands Vu*, Vv*, and Vw* take a minimum value or a maximum value in accordance with the voltage phase θv. More specifically, for example, the voltage command Vu* takes the maximum value when the voltage phase θv is within the phase range from 0 degree to 180 degrees, and takes the minimum value when the voltage phase θv is within the phase range from 180 degrees to 360 degrees. The difference between each of the voltage commands Vv* and Vw* and the voltage command Vu* is only a phase difference, thus the description of the voltage commands Vv* and Vw* is omitted.

As described above, the voltage commands Vu*, Vv*, and Vw* are determined in accordance with the voltage phase θv, thus if the voltage phase θv is calculated, the voltage commands Vu*, Vv*, and Vw* can be generated on the basis of the voltage phase θv.

Figure 8:
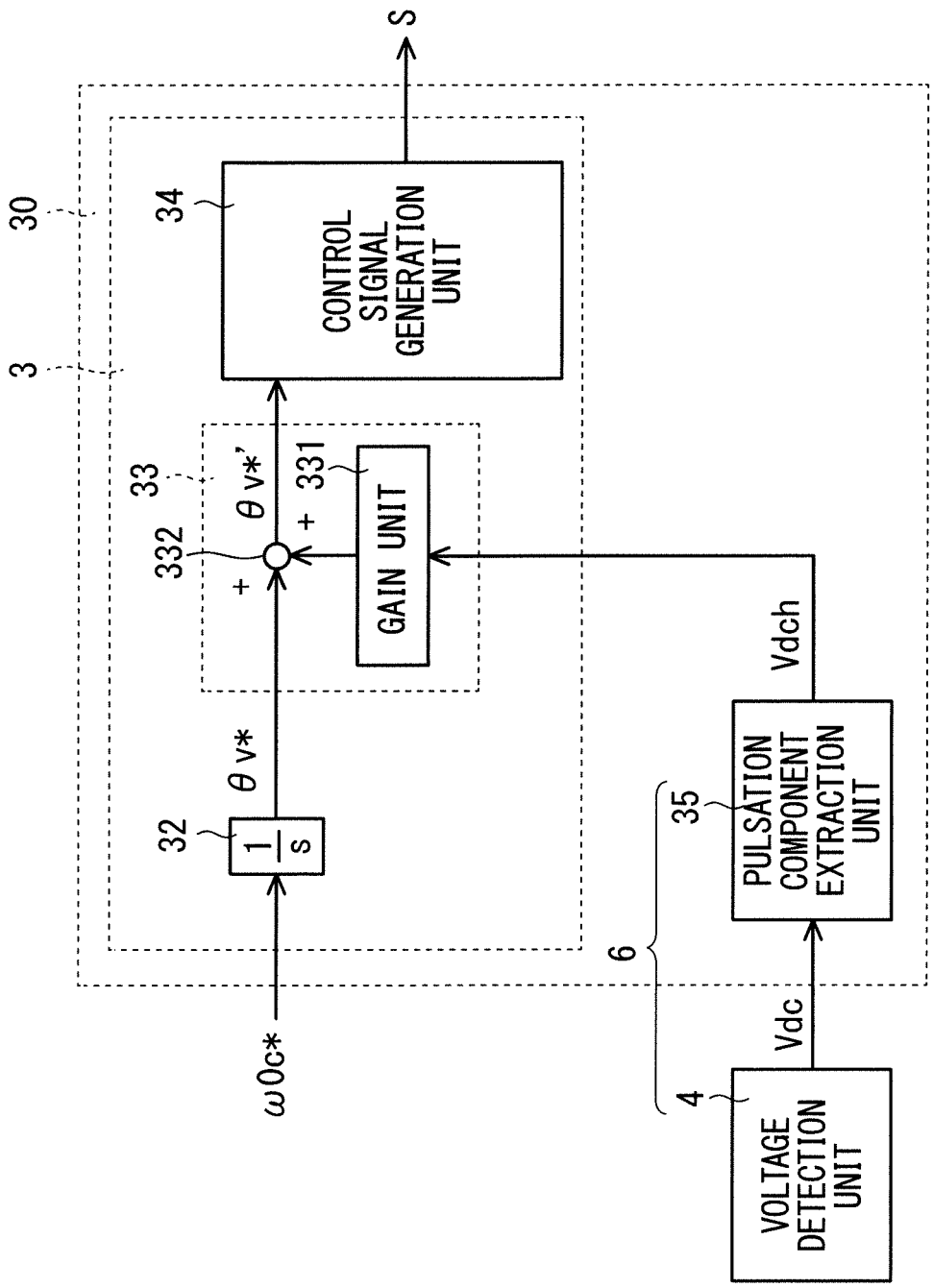
FIG. 8 is a block drawing schematically showing an example of an inner configuration of a control circuit.

FIG. 8 is a function block diagram schematically showing another example of an inner configuration of the control circuit 30. The control circuit 30 includes an integrator 32, a voltage phase correction unit 33, a control signal generation unit 34, and a pulsation component extraction unit 35.

The integrator 32 integrates the rotation speed command ω0c* to calculate the voltage phase command θv*, and outputs the voltage phase command θv* to the voltage phase correction unit 33.

The pulsation component Vdch is also input from the pulsation component extraction unit 35 to the voltage phase correction unit 33. The voltage phase correction unit 33 performs the correction of increasing the voltage phase command θv* in accordance with the increase in the pulsation component Vdch to calculate the corrected voltage phase command θv*'. The voltage phase correction unit 33 outputs the corrected voltage phase command θv*' to the control signal generation unit 34. A specific correction method performed by the voltage phase correction unit 33 is similar to the correction method performed by the voltage phase correction unit 33 in FIG. 4, thus a repetitive description is omitted.

The control signal generation unit 34 generates the control signal S on the basis of the corrected voltage phase command θv*'. For example, the control signal generation unit 34 firstly generates the voltage commands Vu*, Vv*, and Vw* on the basis of the voltage phase command θv*'. For example, the control signal generation unit 34 sets the voltage command Vu* to the maximum value when the voltage phase command θv*' is within a predetermined first phase range (for example 0 to 180 degrees), and sets the voltage command Vu* to the minimum value when the voltage phase command θv*' is within a predetermined second phase range (for example, 180 to 360 degrees). A sum of the first phase range and the second phase range amounts to one cycle phase of the AC voltage (360 degrees). The voltage commands Vv* and Vw* are also generated in the similar manner.

Next, the control signal generation unit 34 compares each of the voltage commands Vu*, Vv*, and Vw* with the carrier, and outputs a result of the comparison as the control signal S, for example. The carrier is a triangle wave, for example, and a maximum value of the triangle wave is equal to the maximum value of the voltage commands Vu*, Vv*, and Vw*, and a minimum value of the triangle wave is equal to the minimum value of the voltage commands Vu*, Vv*, and Vw*.

According to the control signal S above, the power converter 2 outputs the AC voltage Vu, Vv, and Vw substantially equal to the voltage commands Vu*, Vv*, and Vw*. That is to say, the control circuit 30 makes the switching element S1 be in the on state when the voltage phase command θv*' is within the predetermined first phase range (for example, 0 to 180 degrees), and makes the switching element S2 be in the on state when the voltage phase command θv*' is within the predetermined second phase range (for example, 180 to 360 degrees). The processing similar to that described above is also performed in the switching elements S3 to S6.

As described above, the power converter 2 can output the AC voltages Vu, Vv, and Vw of the rectangular wave (for example, one pulse waveform). That is to say, the AC voltages Vu, Vv, and Vw each having substantially a high amplitude can be output. Thus, the electrical motor M1 can be driven at a higher rotation speed. Furthermore, since the voltage phase is corrected in accordance with the increase in the pulsation component Vdch of the DC voltage Vdc, the amplitude of the pulsation component Vdch can also be reduced.

<Trapezoidal Wave>

Figure 9:
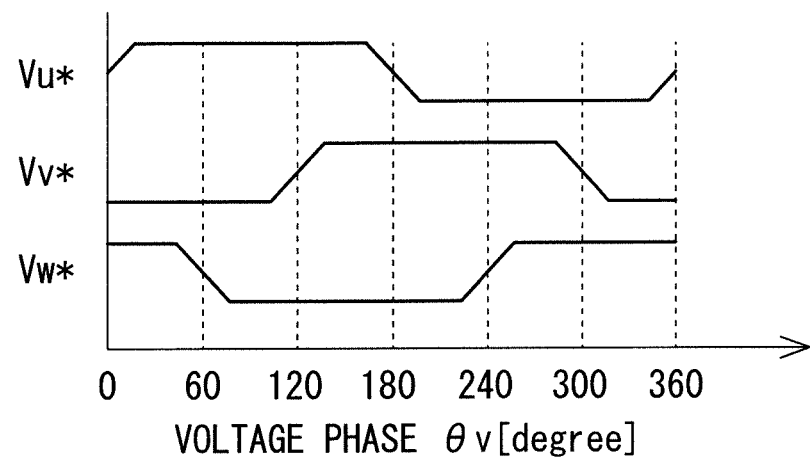
FIG. 9 is a drawing schematically showing an example of voltage commands.

FIG. 9 is a drawing schematically showing an example of the voltage commands Vu*, Vv*, and Vw* having substantially a trapezoidal waveform. The relationship between the voltage phase θv and the voltage command Vu* shown in FIG. 9 may be previously determined, for example, and may be stored in a storage medium belonging to the control circuit 30. The control circuit 30 (specifically, the control signal generation unit 34) may generate the voltage commands Vu*, Vv*, and Vw* based on the corrected voltage phase command θv*' and the relationship described above.

Figure 10:
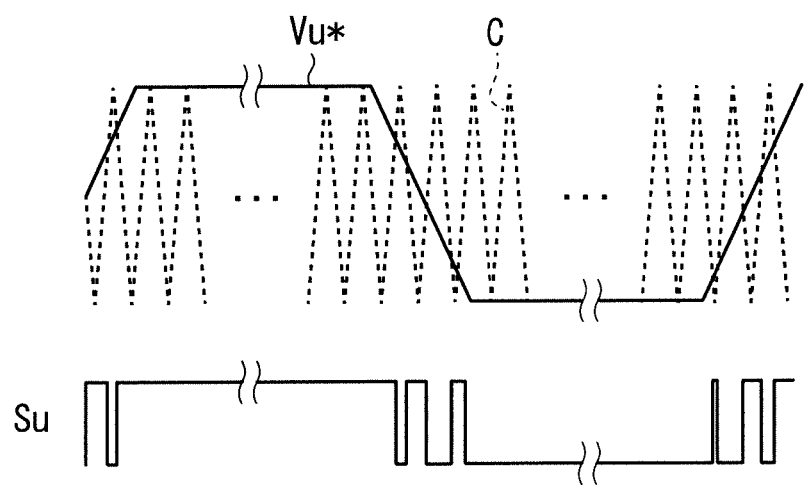
FIG. 10 is a drawing schematically showing an example of a voltage command, a carrier, and a control signal.

FIG. 10 is a drawing schematically showing an example of the voltage command Vu*, the carrier C, and a control signal Su. The control signal Su is a control signal for the switching element S1, and briefly speaking, a waveform thereof is equal to the AC voltage Vu. For example, the carrier C is a triangle wave, and a maximum value and a minimum value of the triangle wave are equal to a maximum value and a minimum value of the voltage command Vu*, respectively. In the example in FIG. 10, when the voltage command Vu* is equal to or larger than the carrier C, the control signal Su is activated, and when the voltage command Vu* is smaller than the carrier C, the control signal Su is inactivated.

As shown in FIG. 10, when the voltage command Vu* takes the maximum value, the voltage command Vu* is equal to or larger than the carrier C, thus the control signal Su is activated. When the voltage command Vu* takes the maximum value over a several cycles of the carrier C, the control signal Su is activated over the several cycles of the carrier C.

In a period of time when the voltage command Vu* transitions between the maximum value and the minimum value, a magnitude relationship between the voltage command Vu* and the carrier C alternately switches in one cycle of the carrier C. Thus, in this period of time, the control signal Su is alternately activated and inactivated.

when the voltage command Vu* takes the minimum value, the voltage command Vu* is smaller than the carrier C, thus the control signal Su is inactivated. When the voltage command Vu* takes the minimum value over a several cycles of the carrier C, the control signal Su is inactivated over the several cycles of the carrier C.

Accordingly, as shown in FIG. 10, the control signal Su includes a pulse having relatively a wide pulse width and a pulse having relatively a narrow pulse width on both sides thereof. Since the waveform of the control signal Su is nearly equal to the waveform of the AC voltage Vu, the AC voltage Vu also includes a pulse having relatively a wide pulse width and a pulse having relatively a narrow pulse width on both sides thereof.

Also when the voltage commands Vu*, Vv*, and Vw* having such a substantial trapezoidal waveform are applied, the AC voltages Vu, Vv, and Vw having substantially a large amplitude can be output. Furthermore, since the voltage phase command θv* is corrected in accordance with the increase in the pulsation component Vdch of the DC voltage Vdc, the amplitude of the pulsation component Vdch can also be reduced.

Figure 11:
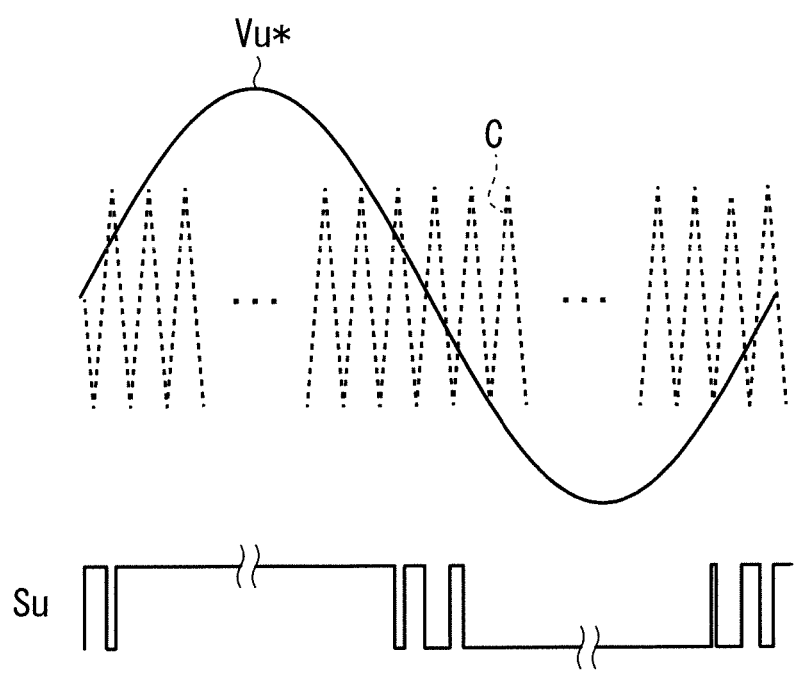
FIG. 11 is a drawing schematically showing an example of a voltage command, a carrier, and a control signal.

The sinusoidal waveform may be applied as the voltage command. The correction of the voltage phase in accordance with the pulsation component Vdch is also performed on this voltage command. In this case, the amplitude of the voltage command is set to be larger than the amplitude of the carrier. FIG. 11 is a drawing schematically showing an example of the voltage command Vu*, the carrier C, and the control signal Su. The voltage command Vu* is larger than the carrier C over the several cycles of the carrier C around a peak of the voltage command Vu*. Accordingly, the control signal S is activated over the several cycles. Similarly, the voltage command Vu* is smaller than the carrier C over the several cycles of the carrier C around a bottom of the voltage command Vu*. Accordingly, the control signal S is inactivated over the several cycles.

Considered herein is a pulse number included in one cycle of the AC voltage in a case where the overmodulation control is not performed. When the overmodulation is not performed, the magnitude relationship between the voltage command Vu* and the carrier C alternately switches in each cycle of the carrier C. Thus, the control signal Su (or the AC voltage Vu) includes one pulse for each cycle of the carrier C. Accordingly, a pulse number NP of the AC voltage Vu is expressed by the following expression using a frequency Fv of the AC voltage Vu and a frequency Fc of the carrier C.

$$NP=Fv/Fc \qquad (4)$$

In the meanwhile, in the overmodulation control, the control signal Su is activated or inactivated over the several cycles of the carrier C. Accordingly, the pulse number included in one cycle of the AC voltage in the overmodulation control is smaller than the pulse number NP included in one cycle of the AC voltage in the case where the overmodulation control is not performed. That is to say, the pulse number in the overmodulation control is smaller than the value obtained by dividing the frequency Fv by the frequency Fc (NP). In the overmodulation control, the pulse having a pulse width longer than the cycle of the carrier C is included in the AC voltage.

As described above, in the overmodulation control, the control circuit 30 makes the power converter 2 output the AC voltage including the pulses smaller in number than the pulse number NP, and at least one of the pulses has the pulse width larger than the cycle of the carrier C.

If the AC voltage includes one pulse as shown in FIG. 7, the substantial amplitude of the AC voltage can be maximized, however, the current is hardly detected in the one-shunt system. In the meanwhile, as shown in FIG. 10 and FIG. 11, for example, in the case where the AC voltage includes a plurality of pulses (for example, five or less), the current can be detected by the one-shunt system in one cycle of the carrier C in which one pulse is output.

<Switching of Control in Accordance with Rotation Speed>

For example, the control circuit 30 may operate in accordance with the configuration in FIG. 4 when the rotation speed of the electrical motor M1 is low, and may operate in accordance with the configuration in FIG. 8 when the rotation speed is high. For example, the control circuit 30 initially operates in accordance with the configuration in FIG. 4. When the rotation speed of the electrical motor M1 increases, the amplitude of the voltage command increases. The control circuit 30 calculates the amplitude of the voltage command on the basis of the voltage commands VMc* and VTc*, for example, and determines whether or not the amplitude is larger than a reference value Vref (for example, the DC voltage Vdc). When the control circuit 30 determines that the amplitude is larger than the DC voltage Vdc, the control circuit 30 may operate in accordance with the configuration in FIG. 8.

According to this configuration, the AC voltage having substantially a large amplitude can be output even when the rotation speed of the electrical motor M1 is high, and the rotation speed of the electrical motor M1 can be increased.

<Correction of Rotation Speed Command>

In the example described above, the control circuit 30 performs the correction on the voltage phase. However, the voltage phase is calculated by the integration of the rotation speed command, thus the control circuit 3 may perform the correction on the rotation speed command. That is to say, the correction may be performed on the rotation speed command which is a base of the voltage phase. FIG. 12 is a function block diagram schematically showing still another example of the inner configuration of the control circuit 30. The control circuit 30 in FIG. 12 includes a rotation speed command correction unit 36 in place of the voltage phase correction unit 33 compared with the control circuit 30 in FIG. 8.

The rotation speed command $\omega 0c^*$ and the pulsation component Vdch are input to the rotation speed command correction unit 36. The rotation speed command correction unit 36 performs the correction so that the rotation speed command $\omega 0c^*$ increases in accordance with the increase in the pulsation component Vdch, and generates the corrected rotation speed command $\omega 0c^{*\prime}$. For example, the rotation speed command correction unit 36 includes a gain unit 361 and an adder 362, for example. The pulsation component Vdch is input from the pulsation component extraction unit 35 to the gain unit 361. The gain unit 361 multiplies the pulsation component Vdch by a predetermined gain K, and output a result of the multiplying (K·Vdch) to the adder 362. The rotation speed command $\omega 0c^*$ is also input to the adder 362. The adder 362 adds the output from the gain unit 361 to the rotation speed command $\omega 0c^*$, and outputs a result of the adding to the integrator 32 as the corrected rotation speed command $\omega 0c^{*\prime}$. The following expression indicates an example of a calculation performed by the rotation speed command correction unit 36 in FIG. 12.

$$\omega 0c^{*\prime} = \omega 0c^* + K \cdot Vdch \quad (5)$$

According to the expression (5), the rotation speed command $\omega 0c^{*\prime}$ increases as the pulsation component Vdch increases, and decreases as the pulsation component Vdch decreases. More specifically, the rotation speed command $\omega 0c^{*\prime}$ pulsates similarly to a waveform of the pulsation component Vdch. Thus, it can also be described that the rotation speed command correction unit 36 in FIG. 12 superposes the pulsation component Vdch with the rotation speed command $\omega 0c^*$.

According to the expression (5), when the pulsation component Vdch is positive, the rotation speed command $\omega 0c^{*\prime}$ is calculated to be larger than the rotation speed command $\omega 0c^*$, and when the pulsation component Vdch is negative, the rotation speed command $\omega 0c^{*\prime}$ is calculated to be smaller than the rotation speed command $\omega 0c^*$. That is to say, the rotation speed command correction unit 36 may calculate the corrected rotation speed command $\omega 0c^{*\prime}$ to be larger than the rotation speed command $\omega 0c^*$ which has not been corrected when the DC voltage Vdc is larger than the average value of the DC voltage Vdc, and calculate the corrected rotation speed command $\omega 0c^{*\prime}$ to be smaller than the rotation speed command $\omega 0c^*$ which has not been corrected when the DC voltage Vdc is smaller than the average value of the DC voltage Vdc.

The integrator 32 integrates the rotation speed command $\omega 0c^{*\prime}$ to calculate the voltage phase command $\theta v^{*\prime}$, and outputs the voltage phase command $\theta v^{*\prime}$ to the control signal generation unit 34. The rotation speed command $\omega 0c^{*\prime}$ increases in accordance with the increase in the pulsation component Vdch, thus the voltage phase command $\theta v^{*\prime}$ calculated by the integration of the rotation speed command $\omega 0c^{*\prime}$ also increases in accordance with the increase in the pulsation component Vdch. That is to say, in the example in FIG. 12, the correction is not performed on the voltage phase command $\theta v^* (=\omega 0c^*/s)$ but is performed on the rotation speed command $\omega 0c^*$ which is a base of the calculation. Accordingly, the action similar to that of the correction on the voltage phase command $\theta v^*$ performed by the voltage phase correction unit 33 in FIG. 8 can be obtained.

Figure 13:
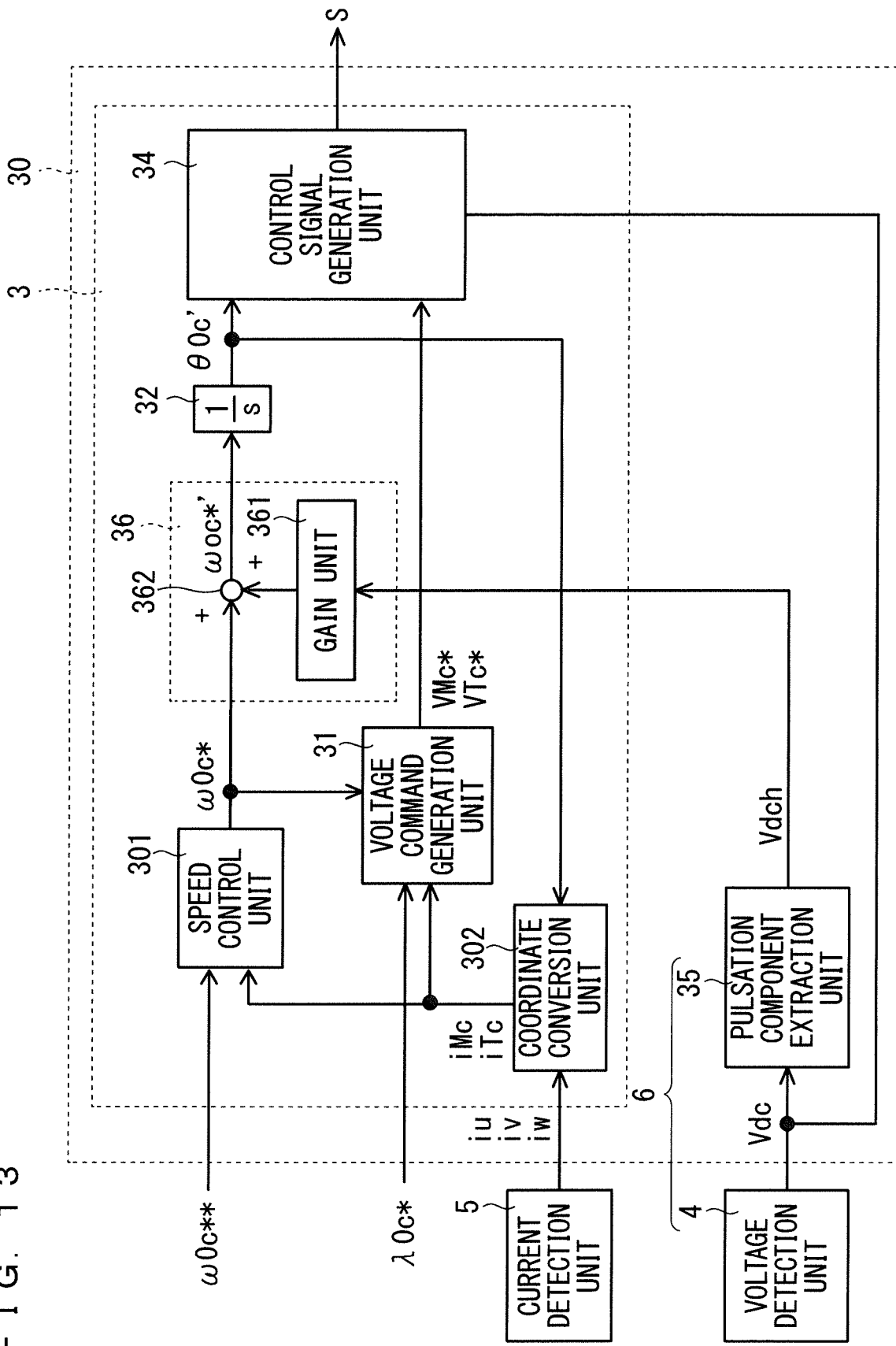
FIG. 13 is a block drawing schematically showing an example of an inner configuration of a control circuit.

The correction on the rotation speed command $\omega 0c^*$ described above can be applied not only to the overmodulation control but also to normal control other than the overmodulation control. FIG. 13 is a function block diagram schematically showing still another example of the inner configuration of the control circuit 30. The control circuit 30 in FIG. 13 includes a rotation speed command correction unit 36 in place of the voltage phase correction unit 33 compared with the control circuit 30 in FIG. 4. Since the function of the rotation speed command correction unit 36 is similar to that of the rotation speed command correction unit 36 in FIG. 12, the repetitive description is omitted.

As exemplified in FIG. 13, the voltage command generation unit 31 may generate the voltage commands VMc* and VTc* using the rotation speed command $\omega 0c^*$ on which the correction using the pulsation component Vdch has not been performed, for example. The corrected rotation speed command $\omega 0c^{*\prime}$ increases and decreases in accordance with the increase and decrease in the pulsation component Vdch, thus if the voltage commands VMc* and VTc* are calculated using the rotation speed command $\omega 0c^{*\prime}$, the amplitude of the voltage commands VMc* and VTc* may also increase and decrease in accordance with the increase and decrease in the pulsation component Vdch. Thus, the voltage command generation unit 31 generates the voltage commands VMc* and VTc* using the rotation speed command $\omega 0c^*$ on which the correction using the pulsation component Vdch has not been performed to avoid such an increase and decrease in the amplitude.

<Pulsation Component Vdch>

The capacitor C1 may be a capacitor having a small capacitance as described above. In this case, the DC voltage Vdc is not sufficiently smoothed by the capacitor C1, but pulsates due to the rectification of the rectifier 1. For example, when the AC source E1 outputs the single-phase AC voltage and the rectifier 1 performs full-wave rectification, the DC voltage Vdc pulsates with twice the frequency of the frequency of the single-phase AC voltage (referred to as the rectification frequency hereinafter). When the AC source E1 outputs an N-phase AC voltage and the rectifier 1 performs full-wave rectification, the DC voltage Vdc pulsates with 2N times the frequency of the frequency of the N-phase AC voltage.

In the meanwhile, the switching frequency of the switching elements S1 to S6 is higher than the rectification frequency, thus the frequency of the pulsation component caused by the switching elements S1 to S6 is higher than the rectification frequency.

In the present embodiment, the pulsation component higher than a rectification component is subject to decrease, however, the frequency component subject to decrease may be optionally set. For example, a resonance frequency of the resonance circuit composed of the reactor L and the capacitor C1 may be subject to decrease. Such a frequency is set by a cut-off frequency of the filter of the pulsation component extraction unit 35.

<Other Example of Electrical Motor Driving Device>

Figure 14:
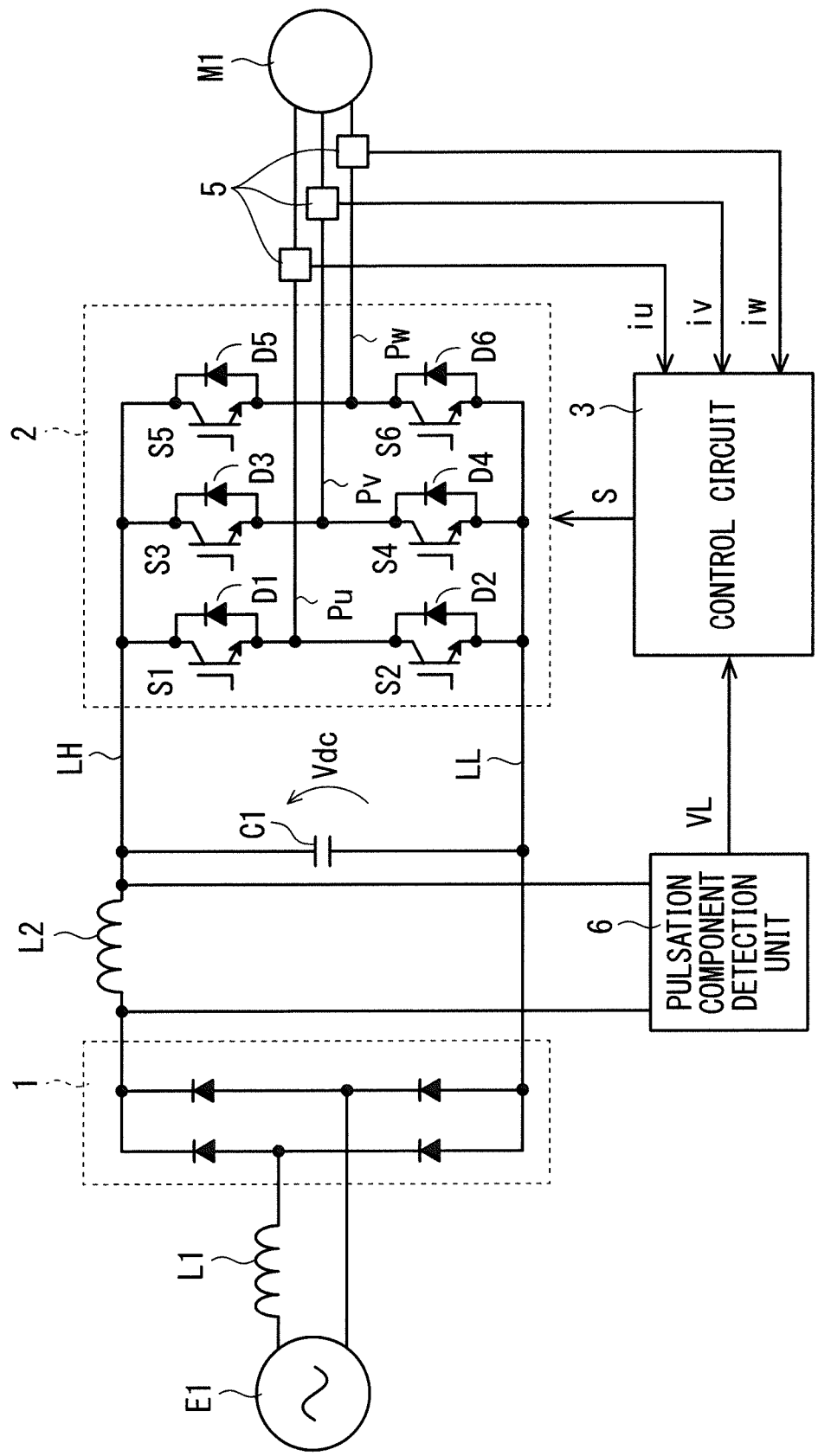
FIG. 14 is a block drawing schematically showing an example of a configuration of an electrical motor driving device.

FIG. 14 is a drawing schematically showing an example of a configuration of an electrical motor driving device. In the example in FIG. 14, the electrical motor driving device further includes a reactor L2 compared with the electrical motor driving device in FIG. 1. The reactor L2 is provided on the DC bus LH between the rectifier 1 and the capacitor C1. The reactor L2 may be provided on the DC bus LL between the rectifier 1 and the capacitor C1.

The capacitor C1 is a capacitor having a small capacitance. Thus, the DC voltage Vdc includes the pulsation component Vdch and the rectification component.

In this case, a voltage VL of the reactor L1 corresponds to the pulsation component Vdch. The reason thereof is briefly described. Firstly, the DC voltage Vdc is a sum of a rectification component Vrec and a pulsation component Vdch, that is (Vrec+Vdch). Considering the voltage VL when potential at one end of the reactor L2 on a side of the capacitor C1 is reference potential, the output voltage of the rectifier 1 is equal to a sum of the voltage VL and the DC voltage Vdc in accordance with Kirchhoff's laws. The output voltage of the rectifier 1 can be considered to be nearly equal to the rectification component Vrec, thus an expression of Vrec=Vdc+VL is established. When an expression of Vdc=Vrec+Vdch is assigned to the above expression, an expression of VL=−Vdch is established. That is to say, ideally speaking, the voltage VL is a reverse phase relative to the pulsation component Vdch. In other words, positive and negative of the voltage VL differs from positive and negative of the pulsation component Vdch.

Similarly, considering the voltage VL when potential at one end of the reactor L2 on a side of the rectifier 1 is reference potential, an expression of Vrec=Vdc−VL is established in accordance with Kirchhoff's laws. When an expression of Vdc=Vrec+Vdch is assigned to the above expression, an expression of VL=Vdch is established. That is to say, ideally speaking, the voltage VL coincide with the pulsation component Vdch.

As described above, the voltage VL corresponds to the pulsation component Vdch. In the example in FIG. 14, the pulsation component detection unit 6 is a voltage detection circuit, and detects the voltage VL of the reactor L2. As a more specific example, the pulsation component detection unit 6 detects, as the reverse phase of the pulsation component Vdch, the voltage VL of the reactor L2 when the potential at one end of the reactor L2 on a side of the capacitor 1 is the reference potential. Alternatively, the pulsation component detection unit 6 detects, as the pulsation component Vdch, the voltage VL of the reactor L2 when the potential in the other end of the reactor L2 is the reference potential. The pulsation component detection unit 6 outputs the detected voltage VL to the control circuit 3.

The control circuit 3 controls the load angle δ based on the voltage VL. For example, if the voltage VL is the reverse phase relative to the pulsation component Vdch, the control circuit 3 controls the load angle δ so that the load angle δ is reduced in accordance with the increase in the instantaneous value of the voltage VL, in other words, the load angle δ is increased in accordance with the decrease in the instantaneous value of the voltage VL. That is to say, the positive and negative of the voltage VL is opposite to the positive and negative of the pulsation component Vdch, thus the relationship between the increase and decrease in the voltage VL and the increase and decrease in the load angle δ is set to be opposite to the relationship between the increase and decrease in the pulsation component Vdch and the increase and decrease in the load angle δ.

As a specific example, the control circuit 3 may correct the phase difference θ0c, the voltage phase command θv*, or the rotation speed command ω0c* which is a base of the calculation of the voltage phase command θv*, on the basis of the voltage VL. As a representative description using the phase difference θ0c', the control circuit 3 may calculate the phase difference θ0c' using the following expression, for example. The same also applies to the voltage phase command θv* and the rotation speed command ω0c*.

$$\theta 0c' = \theta 0c - K \cdot VL \quad (6)$$

For example, if the voltage VL is the same phase as the pulsation component Vdch, the control circuit 3 controls the load angle δ so that the load angle δ is increased in accordance with the increase in the instantaneous value of the voltage VL, in other words, the load angle δ is reduced in accordance with the decrease in the instantaneous value of the voltage VL.

As a specific example, the control circuit 3 may correct the phase difference θ0c, the voltage phase command θv*, or the rotation speed command ω0c* which is a base of the calculation of the voltage phase command θv*, on the basis of the voltage VL. As a representative description using the phase difference θ0c', the control circuit 3 may calculate the phase difference θ0c' using the following expression, for example. The same also applies to the voltage phase command θv* and the rotation speed command ω0c*.

$$\theta 0c' = \theta 0c + K \cdot VL \quad (7)$$

Accordingly, the amplitude of the pulsation component Vdch of the DC voltage Vdc can be reduced. Furthermore, the processing of performing the filtering on the DC voltage Vdc is not necessary in the pulsation component detection unit 6 in FIG. 14, thus the processing can be simply performed. In other words, the pulsation component Vdch can be simply detected.

On the other hand, if the low pass filter 351 is applied as shown in FIG. 5 or the high pass filter not shown is applied, the frequency of the pulsation component Vdch can be appropriately adjusted by adjusting the cut-off frequency of the filter. That is to say, a frequency band subject to decrease can be easily adjusted.

According to the present electrical motor driving device and the control circuit 3, the above embodiments can be appropriately varied or omitted within the scope of the invention as long as they are not mutually inconsistent.

The control device for the power converter has been described in detail, however, the foregoing description is in all aspects illustrative, thus the control device for the power converter is not limited thereto. Various modifications not exemplified are construed to be made without departing from the scope of the control device for the power converter.

The invention claimed is:

1. A device for controlling a power converter that converts a DC voltage including a pulsation component into an AC voltage and outputs said AC voltage to a synchronous electrical motor, comprising:
   a pulsation component detection unit that detects said pulsation component; and
   a control circuit that controls said power converter so that
      a load angle of said synchronous electrical motor is increased in accordance with increase in an instantaneous value of said pulsation component, wherein
   said control circuit controls said power converter so that
      a voltage phase which is a phase of said AC voltage is increased in accordance with increase in an instantaneous value of said pulsation component to increase said load angle,
   generates a first voltage command for said AC voltage in a control coordinate system rotating in accordance with a rotation of said synchronous electrical motor,
   calculates a phase difference of said control coordinate system with respect to a fixed coordinate system, increases said phase difference in accordance with an increase in said instantaneous value of said pulsation component, said increased phase difference representing a corrected phase difference, performs a coordinate conversion on said first voltage command using said corrected phase difference to generate a second voltage command for said AC voltage in said fixed coordinate system, and generates a control signal for controlling said power converter on a basis of said second voltage command.

2. The control device for said power converter according to claim 1, wherein
said control circuit performs a correction of increasing a first voltage phase command for said voltage phase in accordance with increase in an instantaneous value of said pulsation component to generate a second voltage phase command, and
generates a control signal for controlling said power converter on a basis of said second voltage phase command.

3. The control device for said power converter according to claim 1, wherein
said control circuit corrects a first rotation speed command for a rotation speed of said synchronous electrical motor in accordance with increase in an instantaneous value of said pulsation component to generate a second rotation speed command,
integrates said second rotation speed command to generate a voltage phase command for said voltage phase, and
generates a control signal for controlling said power converter on a basis of said voltage phase command.

4. A device for controlling a power converter that converts a DC voltage including a pulsation component into an AC voltage and outputs said AC voltage to a synchronous electrical motor, comprising:
a pulsation component detection unit that detects said pulsation component; and
a control circuit that controls said power converter so that a load angle of said synchronous electrical motor is increased in accordance with increase in an instantaneous value of said pulsation component, wherein
said control circuit controls said power converter so that a voltage phase which is a phase of said AC voltage is increased in accordance with increase in an instantaneous value of said pulsation component to increase said load angle,
generates a first voltage command for said AC voltage in a control coordinate system rotating in accordance with a rotation of said synchronous electrical motor,
corrects a first rotation speed command for a rotation speed of said synchronous electrical motor in accordance with increase in said instantaneous value of said pulsation component to generate a second rotation speed command,
generates a phase difference of said control coordinate system with respect to a fixed coordinate system by integrating said second rotation speed command,
performs a coordinate conversion on said first voltage command using said phase difference to generate a second voltage command for said AC voltage in said fixed coordinate system, and
generates a control signal for controlling said power converter on a basis of said second voltage command.

5. The control device for said power converter according to claim 4, wherein said control circuit generates said first voltage command on a basis of said first rotation speed command.

6. The control device for said power converter according to claim 1, wherein
said control circuit makes said power converter output one pulse as said AC voltage.

7. The control device for said power converter according to claim 1, wherein
said power converter operates in a pulse width modulation based on a carrier, and
said control circuit makes said power converter output said AC voltage including pulses smaller in number than a value obtained by dividing a frequency of said AC voltage by a frequency of said carrier, and at least one of said pulses having a pulse width larger than a cycle of said carrier.

8. The control device for said power converter according to claim 1, wherein
said synchronous electrical motor includes an armature having an armature winding and a field, and
said control circuit executes a primary magnetic flux control for controlling a magnitude of a primary magnetic flux which is a synthesis of an interlinkage magnetic flux to said armature winding by said field and a magnetic flux by an armature reaction generated by an alternating current flowing in said armature winding.

9. The control device for said power converter according to claim 1, wherein
a first DC bus and a second DC bus, between which said DC voltage is applied, are connected to said power converter,
a capacitor is connected between said first DC bus and said second DC bus,
a reactor is provided on said first DC bus or said second DC bus on an opposite side of said power converter relative to said capacitor, and
said pulsation component detection unit detects, as a reverse phase relative to said pulsation component, a voltage of said reactor when potential at one end of the reactor on a side of said capacitor is reference potential, or detects, as said pulsation component, a voltage of said reactor when potential at another end of the reactor is reference potential.

10. The control device for said power converter according to claim 2, wherein
a first DC bus and a second DC bus, between which said DC voltage is applied, are connected to said power converter,
a capacitor is connected between said first DC bus and said second DC bus,
a reactor is provided on said first DC bus or said second DC bus on an opposite side of said power converter relative to said capacitor, and
said pulsation component detection unit detects, as a reverse phase relative to said pulsation component, a voltage of said reactor when potential at one end of the reactor on a side of said capacitor is reference potential, or detects, as said pulsation component, a voltage of said reactor when potential at another end of the reactor is reference potential.

11. The control device for said power converter according to claim 3, wherein
a first DC bus and a second DC bus, between which said DC voltage is applied, are connected to said power converter, a capacitor is connected between said first DC bus and said second DC bus, a reactor is provided on said first DC bus or said second DC bus on an opposite side of said power converter relative to said capacitor, and said pulsation component detection unit detects, as a reverse phase relative to said pulsation component, a voltage of said reactor when potential at one end of the reactor on a side of said capacitor is reference potential, or detects, as said pulsation component, a voltage of said reactor when potential at another end of the reactor is reference potential.

12. The control device for said power converter according to claim 4, wherein a first DC bus and a second DC bus, between which said DC voltage is applied, are connected to said power converter, a capacitor is connected between said first DC bus and said second DC bus, a reactor is provided on said first DC bus or said second DC bus on an opposite side of said power converter relative to said capacitor, and said pulsation component detection unit detects, as a reverse phase relative to said pulsation component, a voltage of said reactor when potential at one end of the reactor on a side of said capacitor is reference potential, or detects, as said pulsation component, a voltage of said reactor when potential at another end of the reactor is reference potential.

13. The control device for said power converter according to claim 5, wherein a first DC bus and a second DC bus, between which said DC voltage is applied, are connected to said power converter, a capacitor is connected between said first DC bus and said second DC bus, a reactor is provided on said first DC bus or said second DC bus on an opposite side of said power converter relative to said capacitor, and said pulsation component detection unit detects, as a reverse phase relative to said pulsation component, a voltage of said reactor when potential at one end of the reactor on a side of said capacitor is reference potential, or detects, as said pulsation component, a voltage of said reactor when potential at another end of the reactor is reference potential.

14. The control device for said power converter according to claim 6, wherein a first DC bus and a second DC bus, between which said DC voltage is applied, are connected to said power converter, a capacitor is connected between said first DC bus and said second DC bus, a reactor is provided on said first DC bus or said second DC bus on an opposite side of said power converter relative to said capacitor, and said pulsation component detection unit detects, as a reverse phase relative to said pulsation component, a voltage of said reactor when potential at one end of the reactor on a side of said capacitor is reference potential, or detects, as said pulsation component, a voltage of said reactor when potential at another end of the reactor is reference potential.

15. The control device for said power converter according to claim 7, wherein a first DC bus and a second DC bus, between which said DC voltage is applied, are connected to said power converter, a capacitor is connected between said first DC bus and said second DC bus, a reactor is provided on said first DC bus or said second DC bus on an opposite side of said power converter relative to said capacitor, and said pulsation component detection unit detects, as a reverse phase relative to said pulsation component, a voltage of said reactor when potential at one end of the reactor on a side of said capacitor is reference potential, or detects, as said pulsation component, a voltage of said reactor when potential at another end of the reactor is reference potential.

16. The control device for said power converter according to claim 8, wherein a first DC bus and a second DC bus, between which said DC voltage is applied, are connected to said power converter, a capacitor is connected between said first DC bus and said second DC bus, a reactor is provided on said first DC bus or said second DC bus on an opposite side of said power converter relative to said capacitor, and said pulsation component detection unit detects, as a reverse phase relative to said pulsation component, a voltage of said reactor when potential at one end of the reactor on a side of said capacitor is reference potential, or detects, as said pulsation component, a voltage of said reactor when potential at another end of the reactor is reference potential.

\* \* \* \* \*